(12) United States Patent
Hassan-Ali et al.

(10) Patent No.: US 7,283,532 B2
(45) Date of Patent: Oct. 16, 2007

(54) HIERARCHICAL SCHEDULER ARCHITECTURE FOR USE WITH AN ACCESS NODE

(75) Inventors: Mudhafar Hassan-Ali, Rohner Park, CA (US); Jeff Mendelson, Petaluma, CA (US); Annie Rastello, Rohnert Park, CA (US); Li-Sheng Chen, Petaluma, CA (US); Radimir Shilshtut, Rohnert Park, CA (US); Sina Soltani, Rohnert Park, CA (US); Francisco Moreno, Petaluma, CA (US)

(73) Assignee: Alcatel Lucent, Paris (FR)

( * ) Notice: Subject to any disclaimer, the term of this patent is extended or adjusted under 35 U.S.C. 154(b) by 1054 days.

(21) Appl. No.: 10/280,894

(22) Filed: Oct. 25, 2002

(65) Prior Publication Data

US 2004/0081167 A1    Apr. 29, 2004

(51) Int. Cl.
*H04L 12/56* (2006.01)
(52) U.S. Cl. .................. 370/395.42; 370/401
(58) Field of Classification Search ............ 370/395.4, 370/395.41, 395.42
See application file for complete search history.

(56) References Cited

U.S. PATENT DOCUMENTS

| 4,878,048 | A | 10/1989 | Gottesman et al. |
|---|---|---|---|
| 5,119,370 | A | 6/1992 | Terry |
| 5,237,565 | A | 8/1993 | Henrion et al. |
| 5,287,355 | A | 2/1994 | Takahashi et al. |
| 5,383,180 | A | 1/1995 | Kartalopoulos |
| 5,396,622 | A | 3/1995 | Lee |
| 5,526,344 | A | 6/1996 | Langdon et al. |
| 5,734,656 | A | 3/1998 | Prince et al. |
| 5,784,371 | A | 7/1998 | Iwai |
| 5,850,399 | A | 12/1998 | Ganumkhi et al. |
| 5,859,835 | A | 1/1999 | Varma et al. |
| 5,862,136 | A | 1/1999 | Irwin |
| 5,872,769 | A * | 2/1999 | Caldara et al. ............. 370/230 |
| 5,875,190 | A | 2/1999 | Law |

(Continued)

FOREIGN PATENT DOCUMENTS

EP    0 901 302 A2    3/1999

(Continued)

OTHER PUBLICATIONS

Giroux, Natalie and Ganti, Sudhakar, "Queuing and Scheduling", Quality of Service in ATM Networks: State of the Art Traffic Management, Chapter 5, pates 85-121.

(Continued)

*Primary Examiner*—Brian Nguyen
(74) *Attorney, Agent, or Firm*—Danamraj & Youst, PC; Bobby D. Slaton

(57) ABSTRACT

A hierarchical scheduler architecture for use with an access node terminal disposed in an access network portion. Ingress flows aggregated via a plurality of aggregation layers are switched through an ATM fabric that segregates flow cells based on service priority categories (planes). Thus, a two-dimensional scheduler employs arbitration on a per-aggregation layer, per-service priority basis, wherein each layer is responsible for selecting the most eligible flow from the constituent flows of that layer, which is forwarded to the next layer for arbitration. A service-based arbiter selects overall winner cells for emission through the fabric from winner cells generated for each service plane.

28 Claims, 14 Drawing Sheets

U.S. PATENT DOCUMENTS

| | | |
|---|---|---|
| 5,878,042 A | 3/1999 | Fraas et al. |
| 5,889,773 A | 3/1999 | Stevenson, III |
| 5,896,382 A | 4/1999 | Davis et al. |
| 5,901,024 A | 5/1999 | Deschaine et al. |
| 5,926,479 A | 7/1999 | Baran |
| 5,953,338 A | 9/1999 | Ma |
| 6,031,822 A * | 2/2000 | Wallmeier ............ 370/235 |
| 6,064,650 A | 5/2000 | Kappler et al. |
| 6,064,651 A | 5/2000 | Rogers et al. |
| 6,081,507 A | 6/2000 | Chao et al. |
| 6,128,295 A | 10/2000 | Larsson et al. |
| 6,353,593 B1 | 3/2002 | Chen |
| 6,370,159 B1 | 4/2002 | Eidson |
| 6,411,957 B1 | 6/2002 | Dijkstra |
| 6,415,325 B1 | 7/2002 | Morrien |
| 6,434,140 B1 | 8/2002 | Barany et al. |
| 6,480,487 B1 | 11/2002 | Wegleitner et al. |
| 6,480,511 B1 | 11/2002 | Petty |
| 6,574,217 B1 | 6/2003 | Lewis et al. |
| 6,728,239 B1 | 4/2004 | Kung et al. |
| 6,904,060 B2 | 6/2005 | Nelson et al. |
| 6,914,898 B2 | 7/2005 | Kaczmarczyk et al. |
| 6,950,441 B1 | 9/2005 | Sasagawa et al. |
| 6,985,489 B2 * | 1/2006 | Ando et al. ............ 370/395.5 |
| 2002/0122424 A1 * | 9/2002 | Kawarai et al. ............ 370/394 |
| 2003/0161303 A1 * | 8/2003 | Mehrvar et al. ............ 370/386 |

FOREIGN PATENT DOCUMENTS

| | | |
|---|---|---|
| EP | 0 961 512 A1 | 12/1999 |
| EP | 1 093 266 A2 | 4/2001 |
| EP | 1 111 855 A2 | 6/2001 |
| EP | 1 111 858 A2 | 6/2001 |
| EP | 0 522 773 A2 | 5/2004 |
| EP | 0 713 347 A2 | 5/2004 |
| WO | 97/04558 | 2/1997 |
| WO | 00/11880 A2 | 3/2000 |
| WO | 01/86884 A1 | 11/2001 |

OTHER PUBLICATIONS

Kaufman, Jill et al "ATM Forum Education Corner", at http://www.atmforum.com/pages/library/53bytes/backissues/others/53bytes-0.994-4.html.

Traffic Management Specification, The ATM Forum Technical Committee, Version 4.1, AF-TM-0121.000, Mar. 1999.

Knuth, D.E.; "The Art of Computer Programming, vol. 3: Sorting and Searching"; 1973; Addison-Wesley Publishing Company, Inc.; USA.

* cited by examiner

HIERARCHICAL SCHEDULER ARCHITECTURE FOR USE WITH AN ACCESS NODE

CROSS-REFERENCE TO RELATED APPLICATION(S)

This application discloses subject matter related to the subject matter disclosed in the following commonly owned co-pending U.S. patent applications: (i) "Stackplane Architecture," filed Dec. 22, 1999, Application Ser. No. 09/469,897, in the names of James W. Dove et al.; (ii) "Scalable Architecture For An Access Node," filed Jun. 27, 2002, Application Ser. No.: 10/184.386, in the name(s) of Eric Friedrichs et al.; (iii) "Integrated Gateway Functionality In An Access Network Element," filed Nov. 2, 2001, Application Ser. No. 10/052,846, in the names of Thornton Collins et at; (iv) "Multicasting System And Method For Use In An Access Node's ATM Switch Fabric," filed even date herewith, Application Ser. No.: 10/280,959, in the names of Mudhafar Hassan-Ali et al.; (v) "System And Method For Implementing GFR Service In An Access Node's ATM Switch Fabric," filed even date herewith, Application Ser. No.: 10/280,700, in the names of Mudhafar Hassan-Ali et al.; (vi) "Calendar Heap System And Method For Efficient Sorting," filed even date herewith, Application Ser. No.: 10/281,033, in the names of Mudhafar Hassan-Ali et al.; (vii) "Virtual Group Connection Scheme For ATM Architecture In An Access Node," filed even date herewith, Application Ser. No.: 10/280,604, in the names of Mudhafar Hassan-Ali et al., which are hereby incorporated by reference herein for all purposes.

BACKGROUND OF THE INVENTION

1. Technical Field of the Invention

The present invention generally relates to telecommunications. More particularly, and not by way of any limitation, the present invention is directed to a hierarchical scheduler architecture for use with a telecommunications node disposed in an access network.

2. Description of Related Art

The remote access market is undergoing a major metamorphosis. Three factors serve as catalysts for change. The first is the growing number of users, for example, small office/home office (SOHO) users, demanding high performance Internet and remote access for multimedia. Liberalized governmental activity with respect to telecommunications is another factor, which is fostering broader competition through deregulation in local area markets everywhere. The third and final factor is congestion in the Public Switched Telephone Network (PSTN), originally designed and developed for voice-only traffic.

There have been several important advances in telecommunications technology that enable high rates of throughput in carrier networks' backbone connections. For example, by implementing Asynchronous Transfer Mode (ATM) networking technology over a Synchronous Optical Network (SONET)/Synchronous Digital Hierarchy (SDH) physical layer, carrier networks can achieve data rates of up to several hundred megabits per second (Mbps). However, efforts to meet the bandwidth demand for remote access have been beset by the limitations of the existing twisted-pair copper cable infrastructure (i.e., access network) provided between a carrier's central office (CO) and a subscriber's remote site, typically referred to as the local loop. In the telecommunications art, these limitations are sometimes collectively described as the "last-mile" problem.

Current access network solutions that attempt to avoid the bottleneck created by the last-mile problem involve the use of fiber optic technology in the local loop also. As with the high-speed carrier networks, the fiber-based local loop infrastructure is typically architected using SONET as the physical layer technology. With recent developments in optical components and related opto-electronics, in addition to improvements in network design, broadband access is now becoming commonplace.

Moreover, coupled with the phenomenal growth in popularity of the Internet, there has been a tremendous interest in using packet-switched network (PSN) infrastructures (e.g., those based on Internet Protocol (IP) addressing) as a replacement for the existing circuit-switched network (CSN) infrastructures used in today's telecommunications networks. From the network operators' perspective, the inherent traffic aggregation in packet-switched infrastructures allows for a reduction in the cost of transmission and the infrastructure cost per end-user. Ultimately, such cost reductions enable the network operators to pass on the concomitant cost savings to the end-users.

Accordingly, a new breed of service-centric networks (distinct from the existing voice-centric and data-centric networks) are being explored for implementation on what is known as the next-generation network (NGN) infrastructure, where integrated voice/data/video applications may be provisioned using a packet transport mechanism over a PSN in an end-to-end transmission path. As alluded to hereinabove, it is believed that using a packet network infrastructure in access networks provides higher transmission efficiency, lower operation and maintenance costs, and a unified access.

Traditional access systems allow accessing a digital local voice switch, such as a Class 5 switch, by extending a plurality of metallic loops and aggregating them in a bundle for efficiently transmitting the time-division multiplexed (TDM) voice traffic. Typically, such access networks are architected using one or more access nodes in a variety of configurations, e.g., point-to-point chains, rings, etc., wherein an access node may itself comprise several channel banks that provide line interfaces servicing a large number of subscribers.

In order to afford increased levels of functionality and service provisioning, however, access networks of today are being required to support advanced transport mechanisms such as SONET for the internal architecture of the nodes as well. In such nodes, ATM is used for carrying most of the subscriber traffic, except the traditional TDM services such as T1 and TDM-DS3 services. Accordingly, both TDM as well as ATM switching fabrics need to be supported in the access node design.

The ATM Forum provides a set of specifications governing the various aspects of an ATM switching fabric, including the fabric's scheduler whose function is to regulate the injection of incoming cells into the fabric. More particularly, the ATMF-TM-121 Standard provides the general description of scheduler requirements. This Standard does not set forth, however, the implementational aspects in specific detail, especially in the context of an access node's internal architecture operable with SONET transport. Whereas several ATM scheduler implementations are known, they are highly complex and require expensive hardware. Not only can the up-front cost of setting up a network with access nodes having such a scheduler arrangement be prohibitively high, but the increased cost structure will be particularly inefficient where only a small number of subscriber lines need to be supported initially, especially in an access node that is not fully populated (i.e., over-provisioned). Moreover, the existing ATM schedulers are not known to be effective where the data to be switched is aggregated in a hierarchical manner.

SUMMARY OF THE INVENTION

Accordingly, the present invention is directed to a hierarchical scheduler architecture for use with an access node terminal disposed in an access network portion, which scheduler architecture advantageously overcomes these and other related deficiencies. Ingress flows aggregated via a plurality of aggregation layers are switched through an ATM fabric that segregates flow cells based on service priority categories (referred to as service planes). Thus, a two-dimensional scheduler employs arbitration on a per-aggregation layer, per-service priority basis, wherein each layer is responsible for selecting the most eligible flow from the constituent flows of that layer, which is forwarded to the next layer for arbitration. A service-based arbiter selects overall winner cells for emission through the fabric from winner cells generated for each service plane.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1:
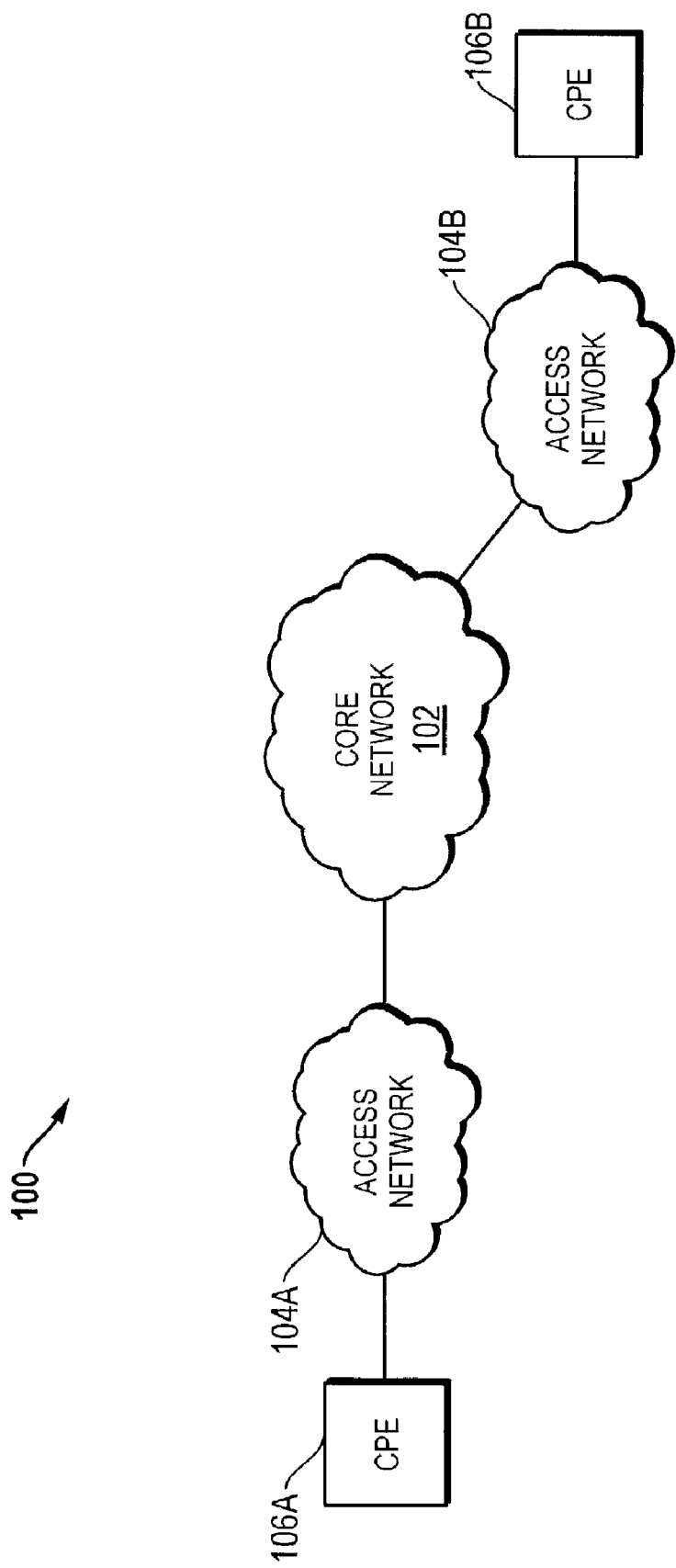
FIG. 1 depicts an exemplary telecommunications network arrangement having an access network portion wherein the teachings of the present invention may be advantageously practiced.

In the drawings, like or similar elements are designated with identical reference numerals throughout the several views thereof, and the various elements depicted are not necessarily drawn to scale. Referring now to FIG. 1, depicted therein is an exemplary network arrangement 100 having one or more access network portions, wherein the teachings of the present invention may be advantageously practiced for providing a hierarchical scheduler for use with an access network element. The exemplary network arrangement 100, comprising a core transport network 102 and access network portions 104A and 104B, is preferably operable to support telecommunications, data communications, or any combination thereof involving diverse media such as voice, audio, video, graphics, data, and assorted multimedia. The core transport network 102 may be provisioned as a circuit-switched network (CSN), packet-switched network (PSN), or an integrated hybrid network capable of next-generation network (NGN) service infrastructure. In an exemplary embodiment, the Public Switched Telephony Network (PSTN) (for wireline communications), the Public Land Mobile Network (PLMN) (for wireless communications), or any combination thereof may be provided as the CSN. Where the core network 102 is implemented as a packet network, it may preferably be comprised of a network operable with Internet Protocol (IP), Frame Relay, ATM, and/or other applicable technologies.

The access network portions 104A and 104B are disposed between end users (i.e., subscribers) exemplified by customer premises equipment (CPE) 106A, 106B, and the core network 102. It should be appreciated that although isolated CPE units are illustrated in this FIG., they may also be disposed in a private network such as a home area network (HAN), customer premises network (CPN), or a premises distribution network (PDN). Furthermore, the CPE units may be comprised of any known or heretofore unknown Integrated Access Devices (IADs) operable with diverse media. The access network portions 104A, 104B are operable to provide remote access to the subscribers by means of various Point-of-Interface (POI) nodes and Point-of-Presence (POP) nodes interconnected via any suitable wireline, wireless, narrowband, or broadband local network. By way of example, such a local network may be implemented using well known technologies such as the Integrated Services Digital Network (ISDN), Digital Subscriber Line (DSL) and its variants, Fiber In The Loop (FITL) and its variants, Hybrid Fiber/Coaxial (HFC) cable technologies, or Wireless Local Loop (WLL) technologies. Additionally, the exemplary access network portions 104A and 104B may be comprised of a converged local network in further embodiments of the present invention.

In an exemplary embodiment, the access network portion (e.g., access network 104A or 104B) is provided as a fiber-based loop carrier system that can be implemented in various arrangements depending on cost, availability of appropriate local infrastructure, services supported, etc. For example, implementations such as Fiber To The Home (FTTH), Fiber To The Curb (FTTC), Fiber To The Neighborhood (FTTN), and other FITL variants may be architected as a digital loop carrier (DLC) for providing integrated, broadband access services to the subscribers.

Figure 2:
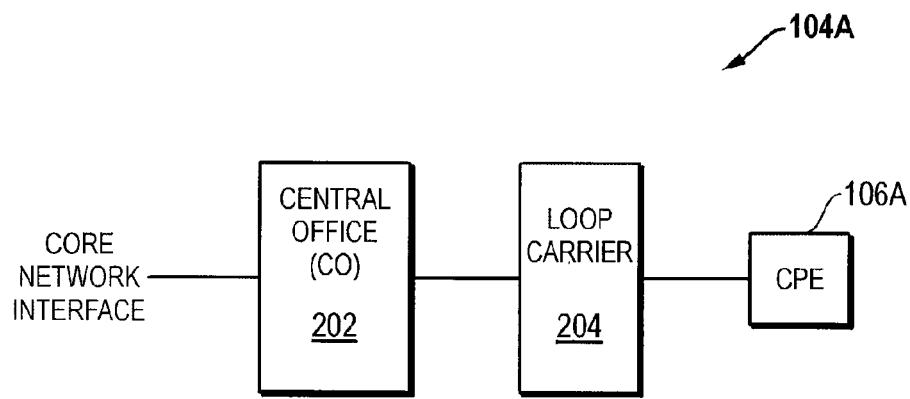
FIG. 2 depicts a high level conceptualization of an access network portion involving a loop carrier in conjunction with a central office.

The fiber-based loop carrier system is preferably at least operable with a suitable physical layer infrastructure such as the Synchronous Optical Network (SONET) technology or its companion, the Synchronous Digital Hierarchy (SDH), which is similar to SONET except that its multiplexing hierarchy is a subset of the SONET multiplexing scheme. FIG. 2 depicts a high level conceptualization of the exemplary access network portion (e.g., access network 104A) involving a loop carrier 204 in conjunction with a central office (CO) 202. An exemplary IAD, for instance CPE 106A, is coupled to the loop carrier 204 that is operable to multiplex the access loop signal between the subscriber equipment and the CO with other loop signals. The POI equipment located at the CO is operable, in turn, to provide interface connectivity to the core transport network.

In accordance with the SONET requirements, the loop carrier 204 is preferably operable with a broad range of Optical Carrier (OC) signals, e.g., OC-3, OC-12, OC-48, et cetera, and the electrical equivalents corresponding thereto, namely, Synchronous Transport Signal (STS)-3, STS-12, STS-48, et cetera. SONET, as the name implies, uses a synchronous transmission scheme, with a SONET frame transmitted every 125 microseconds. Each frame is logically organized as a two-dimensional array of bytes whose size is dependent on the channel rate. The basic SONET channel is an STS-1 (corresponding to OC-1) which consists of frames that have 810 bytes organized in 9 rows by 90 columns. At 8,000 frames per second, this gives a raw channel rate of 51.84 Mbps. Since the overhead for managing SONET line and section equipment consumes 3 of 90 columns (leaving 87 columns of payload, called the Synchronous Payload Envelope or SPE) and the path overhead typically comprises one column, a net user data rate of 49.536 Mbps (86 columns×9 rows×8 bits×8000 frames/second) is available per STS-1 channel.

Data rates higher than STS-1 are obtained by multiplexing multiple STS-1 signals. For example, three STS-1 signals can be byte-interleaved to form an STS-3 signal that operates at 155.52 Mbps. Another form of multiplexing is to concatenate the overhead and payload bytes of multiple STS-1 signals, for example, where an STS-3c frame contains 9 overhead columns and 261 columns for the SPE, giving rise to the data rate of 155.52 Mbps. In the general case, an STS-n frame is an electrical signal having n-tuples of STS-1 frames which, when modulated over an optical carrier, is referred to as an OC-n optical signal.

Transmission rates lower than STS-1 can be obtained by subdividing the payload into what are known as Virtual Tributaries (VTs) which can support data rates from Digital Signal (DS)-1 (operating at 1.544 Mbps) to DS-2 (6.312 Mbps). An STS-1 signal can be logically divided into VTs having separate identities, whereby each VT is operable to carry the same amount of payload through the fiber. Because the data within each VT retains its own ID, it can be easily separated from the rest of the STS-1 signal. Accordingly, where a loop carrier system traverses a number of nodes or sub-nodes (i.e., partitions or shelves within a node) appropriate VTs may be "dropped" at each node/sub-node for processing. VTs are also useful when a SONET-based access network interfaces with another network based on the Pleisochronous Digital Hierarchy (PDH) which is built upon DS-0 (64 Kbps) channels. As will be described hereinbelow, a scalable nodal architecture can be advantageously provided by utilizing a SONET-like carrier transport system for transporting all internal data flows within an access node, wherein the add/drop functionality is beneficially implemented within the context of the local (i.e., internal) inter-shelf communications as well.

Figure 3:
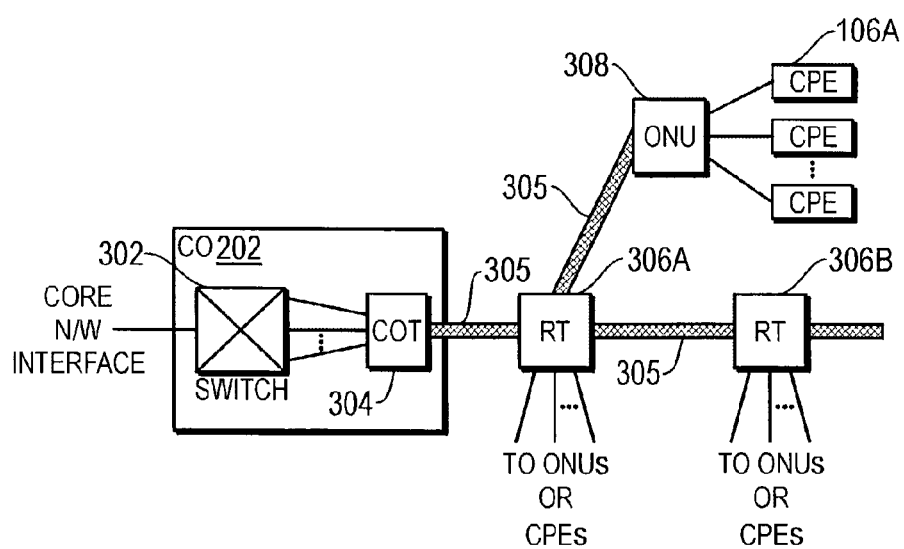
FIG. 3 depicts an exemplary embodiment of a loop carrier system having a plurality of nodes (or, terminals) wherein an embodiment of the hierarchical scheduler of the present invention may be provided in a terminal in accordance with the teachings of the present patent application.

Referring now to FIG. 3, depicted therein is an exemplary embodiment of a fiber-based loop carrier system having a plurality of nodes wherein a hierarchical scheduler may be provided within a node having scalable inter-shelf architecture. The loop carrier nodes, which may also be referred to as access network nodes or terminals (more generically, telecommunications nodes), may be organized in one of several topologies for purposes of the present invention and are comprised of two forms depending on their location in the access loop. When co-located at a CO, the loop carrier node is referred to as a central office terminal (COT). Reference numeral 304 exemplifies a COT coupled to a CO switch 302 that forms part of CO 202. Other loop carrier nodes external to the CO are referred to as remote terminals (RTs), e.g., RT 306A and 306B.

Fiber paths 305, preferably operable to carry signals of OC-3 or higher rates, are used for interconnecting the COT and RTs in a particular topology. Where only one RT is coupled to the COT, the resultant two-node arrangement is referred to as a point-to-point loop carrier system. On the other hand, if multiple RTs are coupled in a linear fashion, either a single feeder multiple RT (MRT) system or a dual feeder MRT system may be obtained. In a single feeder MRT system, the RTs are located on only one side of the COT, as exemplified in this FIG. In the dual feeder MRT system, the RTs are disposed on both sides of the COT, which sides are conventionally referred to as "East" and "West" sides. Accordingly, fiber optic cables emanate from the COT and run in two different directions relative thereto, each branch feeding one or more RTs.

In a further exemplary embodiment, the loop carrier system may be arranged in a ring topology. For example, a unidirectional path switched ring (UPSR) topology is obtained where the westernmost and easternmost nodes of a dual feeder MRT are connected to each other. As a matter of convention, the East direction from the COT carries the communication traffic, whereas the West direction from the COT is provided as the "protect" direction in case there is a failure in the East direction cable (e.g., it is cut) or its performance degrades to a predetermined level.

Regardless of the particular topological configuration used for implementing a DLC, either the COT, RTs, or both may be provided with the capability to concentrate the total access lines connected thereto. That is, the total number of lines to which a terminal is connected may be greater than the maximum number of active lines supported by it. Accordingly, each terminal may have its own concentration ratio (which is the ratio between the total number of connection lines and the maximum number of active lines supported by the terminal).

In addition to the COT and RT access loop nodes, the exemplary loop carrier system may also include other equipment such as Optical Network Units (ONUs) that serve end users that are far enough away from each other that it isn't economical to connect all of them to an RT. The ONUs are operable to convert the signals between electrical and optical domains, if necessary. Also, the ONUs digitize the analog communication signals from a plurality of customers and multiplex them onto a piece of fiber coupled to the RT. In FIG. 3, reference numeral 308 refers to an ONU that is coupled to RT 306A and serves, by way of example, IAD/CPE 106A. Further, an RT in the loop carrier system may be coupled to one or more ONUs and RTs, in addition to the CPEs directly served by the RT.

Figure 4:
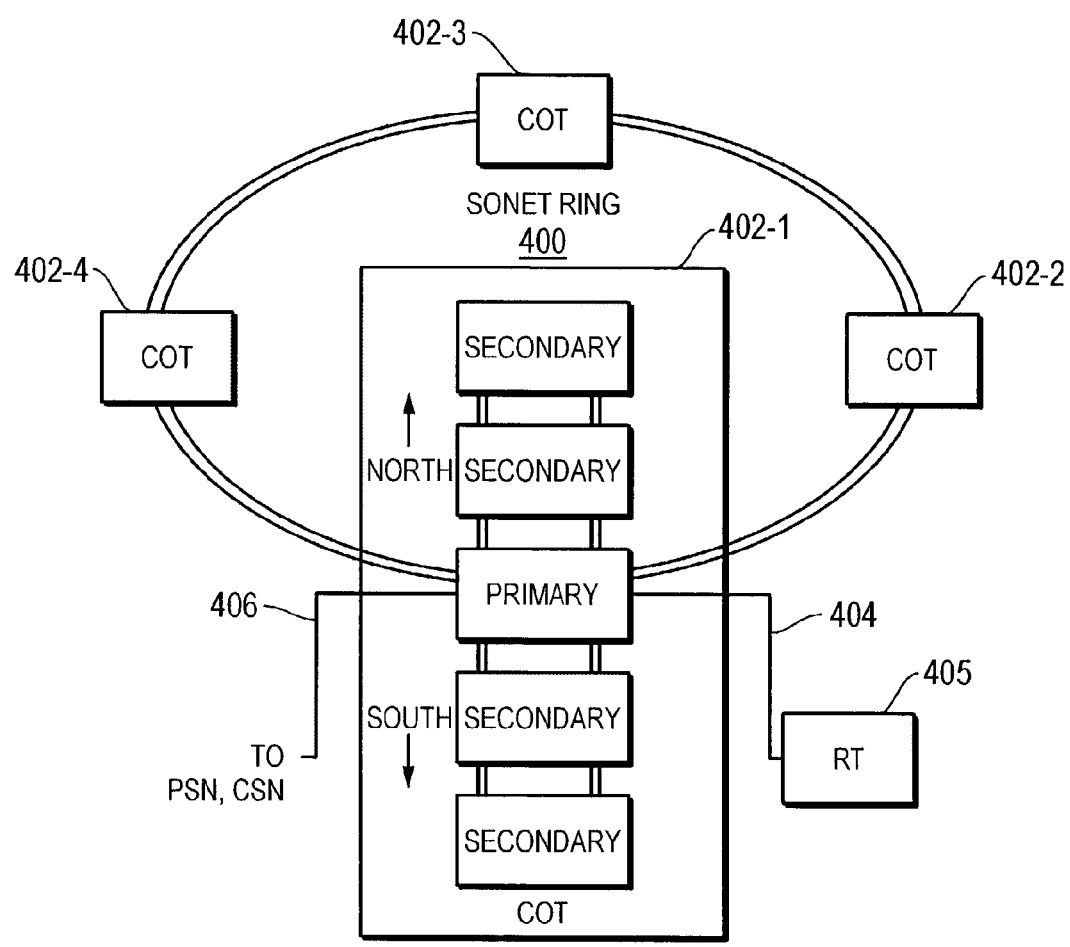
FIG. 4 depicts an exemplary ring topology involving multiple central office terminals (COTs)

FIG. 4 depicts an exemplary SONET ring topology 400 involving multiple terminals. A plurality of COTs 402-1 through 402-4 are connected together in the ring configuration that may be implemented as an UPSR or a bidirectional line switched ring (BLSR). COT 402-1 is particularly exemplified with a plurality of shelves organized in a scalable architecture, wherein the primary shelf is shown with network transport interfaces 406 towards a PSN, CSN, or a combination thereof. A point-to-point SONET link 404 is also exemplified between the primary shelf of COT 402-1 and an RT 405.

Figure 5:
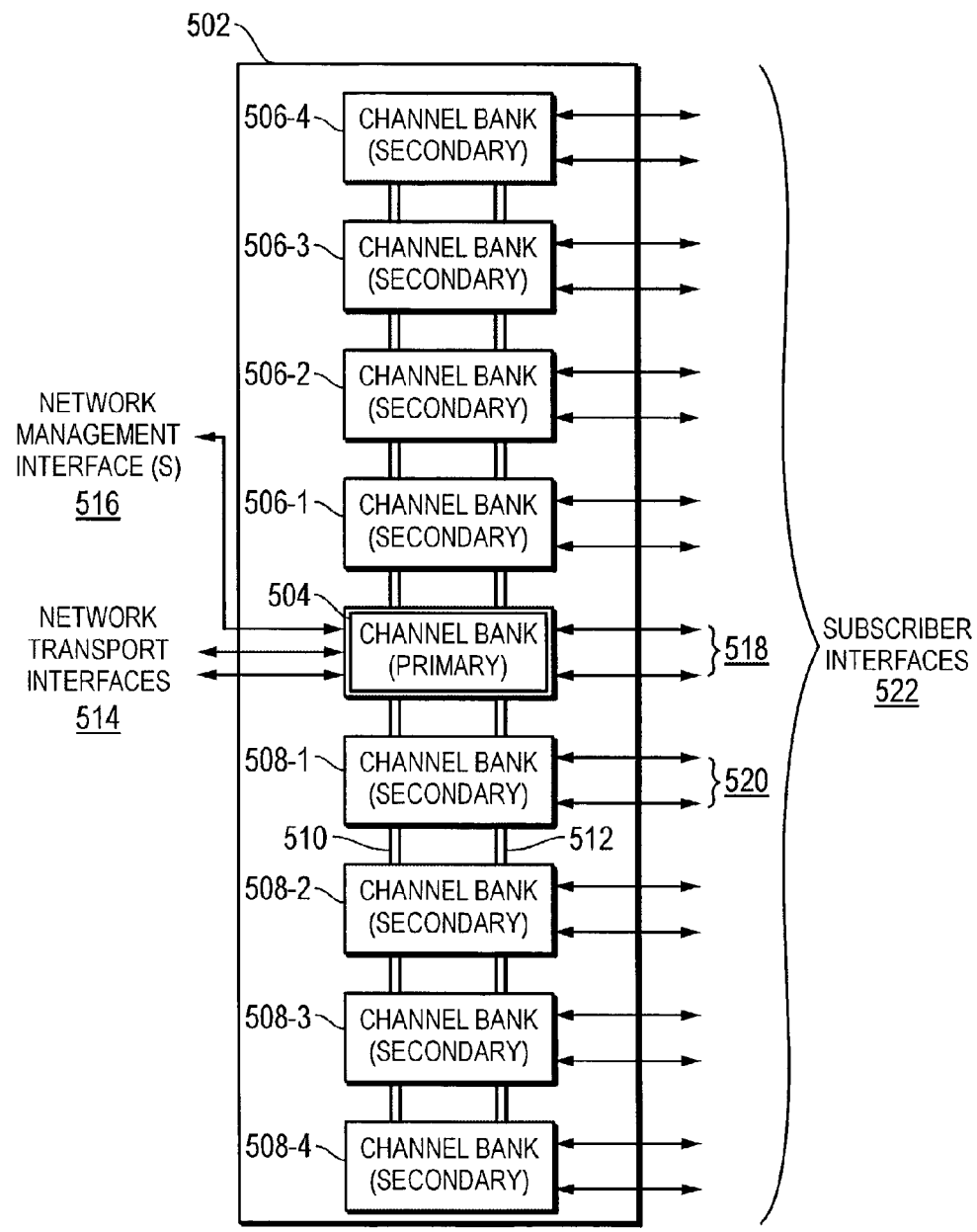
FIG. 5 depicts a high level block diagram of an exemplary access node terminal having the hierarchical scheduler architecture of the present invention, which terminal may be operable as a COT or as a remote terminal (RT) in an access network.

Referring now to FIG. 5, depicted therein is a high level block diagram of an exemplary access node terminal 502 operable as a COT or an RT in an access network, which terminal is provided with the hierarchical scheduler architecture of the present invention. Preferably, the exemplary terminal 502 is provided as an expandable "linear stack" of a plurality of shelves or channel banks which include a primary shelf 504 and a number of secondary shelves logically disposed both above and below the primary shelf. The various secondary shelves are coupled to the primary shelf 504 via a redundant, bi-directional local communication link that includes appropriate inter-shelf data channel(s) and timing/control channel(s). In FIG. 5, reference numerals 510 and 512 refer to the two redundant local communication links, wherein one is provided to be active while the other is operable as a standby link for effectuating protection switchover. As set forth in the incorporated U.S. patent application entitled, "Scalable Architecture For An Access Node," filed Jun. 27, 2002, Application Ser. No.: 10/184,386, cross-referenced hereinabove, the local communication links interfacing the adjacent channel banks are provided to be internal to the access node 502 and are architected to carry all the internal, full duplex data channels and timing information in SONET-type carrier frames that are mapped accordingly to transport the interbank communications. For purposes of the present invention, these local interfaces effectuate a logical communication plane that can be scaled in order to "stack" as many channel banks as are needed and thus may be referred to as a "stackplane" in terms of the internal architecture of the node. Accordingly, the various secondary shelves logically disposed on one side of the primary shelf 504 comprise what may be referred to as the "North" segment of the stackplane. For instance, secondary shelves 506-1 through 506-4 form the North stackplane segment. In similar fashion, secondary shelves 508-1 through 508-4 comprise the South segment of the stackplane.

The access node terminal 502 is provided with a plurality of subscriber interfaces 522 to which various IAD/CPEs may be coupled. The subscriber interfaces 522 can include subscriber interfaces 518 associated with the primary shelf 504 as well as subscriber interfaces 520 associated with secondary shelves, e.g., shelf 508-1. On the network side of the terminal, a plurality of transport network interfaces 514 and network management interfaces 516 are provided as part of the primary shelf's interfacing functionality. As alluded to in the foregoing, various transport networks such as a CSN, PSN, or an integrated network may be coupled to the primary channel bank 504 via the interfaces 514.

Figure 6:
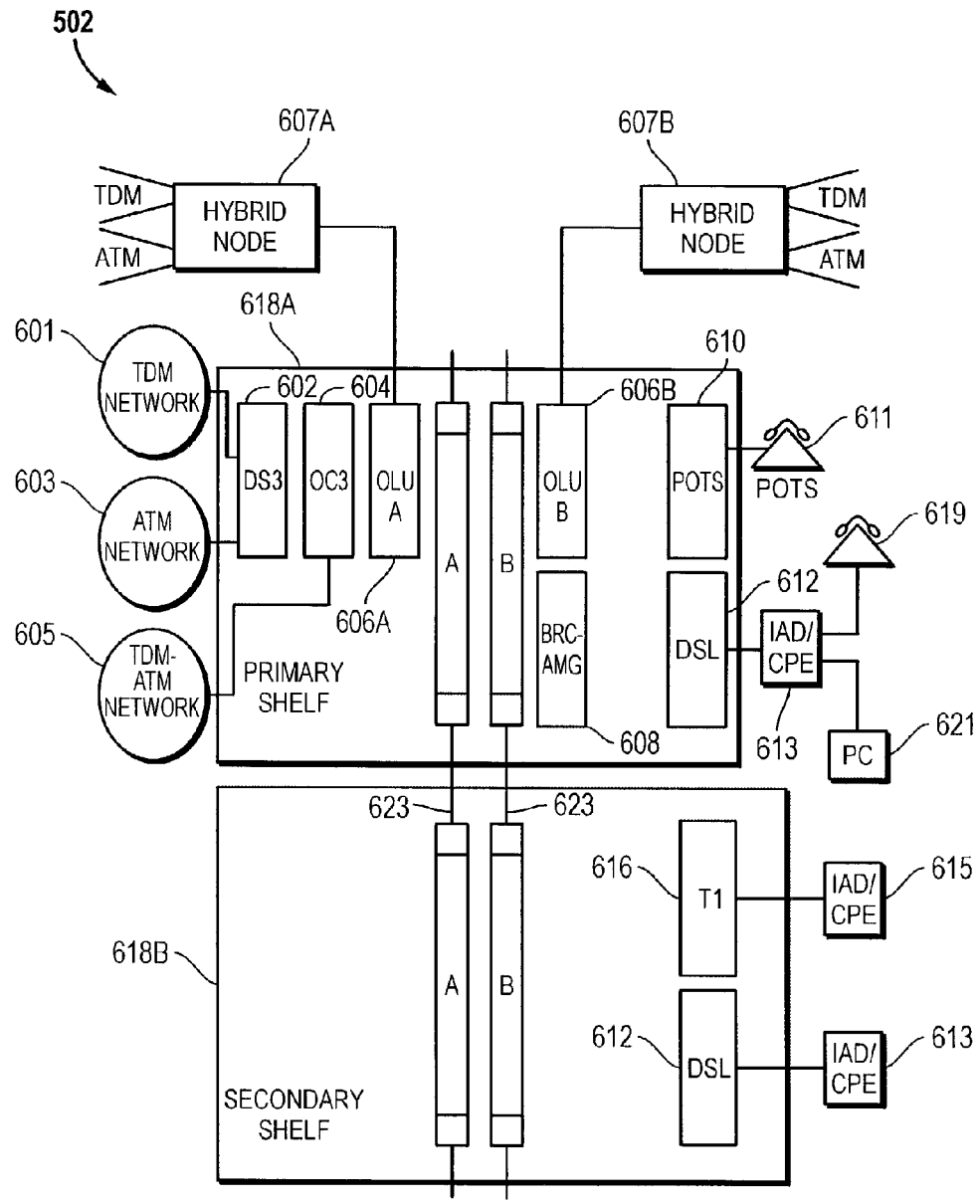
FIG. 6 depicts a shelf-level block diagram of a portion of the access node terminal depicted in FIG. 5, wherein multiple sources of traffic flows are exemplified.

Referring now to FIG. 6, therein is depicted a shelf-level functional block diagram of a portion of the access network node 502 exemplifying a plurality of interfaces and corresponding traffic sources alluded to hereinabove. An exemplary secondary shelf 618B is coupled to the primary shelf 618A via inter-shelf interfaces 623 disposed therebetween for effectuating the stackplane arrangement described above. Reference numeral 608 refers to a broadband resource card disposed in the primary shelf 618A for providing integrated gateway functionality as described in greater detail in the commonly owned co-pending U.S. patent application entitled, "Integrated Gateway Functionality In An Access Network Element," filed Nov. 2, 2001, application Ser. No. 10/052,846, incorporated by reference hereinabove.

Among the exemplary network interfaces provided in the primary shelf 618A are a DS3 interface 602 operable with a TDM network 601 and an ATM network 603; an OC3 interface 604 operable with a TDM/ATM network 605; and optical line units (OLUs) 606A and 606B operable with hybrid nodes 607A and 607B, respectively. Exemplary subscriber interfaces in the primary shelf 618A include a POTS interface 610 operable with conventional telephone equipment 611 and a DSL interface 612 operable with appropriate IAD/CPE 613 comprising derived POTS equipment 619 and one or more computers 621. The secondary shelf 618B is exemplified with a T1 interface 616 operable with IAD/CPE 615 and a DSL interface 612 operable with IAD/CPE 613. For the sake of simplicity, other subsystems such as alarm units, power supplies, et cetera, associated with the shelves are not shown in this FIG.

Based on the foregoing, it should be realized that the access node terminal of the present invention is operable to support a multitude of services such as POTS, T1, xDSL, DS3, OC-n, IP-capable access, all-optical access, Voice-over-DSL (VoDSL), Voice-over-IP (VoIP), Voice-over-ATM (VoATM), et cetera. As part of the access system, the node terminal can reside on a SONET ring, wherein the primary shelf 618A may be designed to have a centralized switching function (either TDM or ATM flows). The secondary shelves, e.g., shelf 618B, may be used in the nodal architecture to multiplex flows that are switched by the primary shelf.

Further, as set forth in the U.S. patent application entitled "Scalable Architecture For An Access Node," filed Jun. 27, 2002, Application Ser. No.: 10/184,386, in the name(s) of Eric Friedrichs et al., incorporated by reference hereinabove, the internal traffic is transported in a modified SONET frame carrier which carries both ATM and TDM payloads. Thus, the access node element 502 is provided with the function of switching, forwarding, aggregating, and grooming various traffic types. To insure the proper handling of the traffic in accordance with established rules of traffic management, an ATM switch is employed, wherein the ingress traffic in fixed length packets called cells is switched to appropriate egress interfaces based on a set of provisioning rules. As will be seen in greater detail hereinbelow, the traffic is switched by the ATM fabric based on the physical port information as well as the Virtual Path and Virtual Circuit Identifiers (i.e., VPI and VCI) specified in a cell's header, wherein a hierarchical scheduler is employed for regulating the injection of incoming cells into the switching fabric. Since the teachings of the present invention are particularly concerned with ATM switching and scheduling within the context of the scalable access node architecture set forth above, a brief description of applicable ATM traffic management principles is provided below.

As is well known, ATM traffic can be categorized based on a Class of Service (CoS) defined by such factors as the time sensitivity, peak and sustained bandwidth guarantees, burstiness and delivery guarantees. Several traffic Classes are contemplated within the ambit of the present invention, which are set forth in the following table:

TABLE I

| Class of Service | Applications | Parameters |
| --- | --- | --- |
| Real time Constant Bit Rate (CBR), real time Variable Bit Rate (rt-VBR) | Voice (single channel or trunk), VBR video, games | Peak Cell Rate (PCR), Cell Delay Variance Tolerance (CDVT) |
| Non-real time Variable Bit Rate (nrt-VBR) | Data, multimedia, email, video streaming | PCR, CDVT, Sustainable Cell Rate (SCR), Maximum Burst Size (MBS) |
| Guaranteed Frame Rate (GFR) | Premium Data, Web browsing, Internet | PCR, CDVT, MBS, Maximum Cell Rate (MCR), Maximum Frame Size (MFS) |
| Best effort (Unspecified Bit Rate or UBR) | Inexpensive data, Web browsing and Internet | PCR, CDVT |

Whereas the service Classes set forth above refer to general application-level classifications, Quality of Service (QoS) parameters are used to associate certain quantitative requirements with a particular ATM connection within the switch. These parameters will be used as reference figures by which the connection will be fulfilled per the user's service contract with the network/service provider. In general, these parameters relate to time sensitivity (i.e., time delay and the regularity of cell arrival) and delivery guarantee (i.e., acceptable cell loss for a given requested bandwidth), and are summarized in a table below:

TABLE II

| Quality of Service | Usage |
| --- | --- |
| Cell Transfer Delay (CTD) | Traffic engineering (TE) |
| Cell Delay Variation (CDV) | TE and scheduling (to prioritize a cell) |
| Cell Loss Ratio (CLR) | To establish queue thresholds; can be used by Call/Connection Admission Control (CAC) |
| Cell Error Ratio (CER) | Related to the quality of links |

In addition to CoS and QoS, ATM connections may typically require what are known as traffic contracts, akin to service level agreements (SLAs), that identify what service Classes and QoS parametrics are expected in service provisioning. Both the ATM switch software (e.g., CAC mechanism) and hardware (e.g., policer, queue manager and scheduler/shaper) operate in concert with respect to a number of traffic descriptors to ensure that the switch fabric's resources are properly allocated so as to be able to fulfill the connection contracts. The following table summarizes the various traffic descriptor parameters that may be used in accordance with the teachings of the present invention:

TABLE III

| Traffic Descriptor | Service Class | Switch fabric component |
| --- | --- | --- |
| Peak Cell Rate (PCR) | CBR, VBR, GFR and UBR | CAC and scheduler |
| Cell Delay Variance Tolerance (CDVT) | CBR, VBR, GFR and UBR | Scheduler and queue allocation manager |
| Sustainable Cell Rate (SCR) | VBR | CAC and scheduler |
| Maximum Burst Size (MBS) | VBR and GFR | Scheduler and queue allocation manager |
| Maximum Frame Size (MFS) | GFR | HW for frame tail discard mechanism |

As set forth above, the access node element is provided with a variety of interfaces and therefore is operable to manage different traffic types. Furthermore, because of the hierarchical arrangement of the nodal architecture, the internal traffic is aggregated via a number of layers (i.e., telescopic data pipe architecture) before switching. In one embodiment of the present invention, at least four traffic aggregation layers are implemented: (i) subport layer, (ii) bus layer, (iii) shelf layer, and (iv) pipe layer. It should be apparent to those skilled in the art that such a traffic aggregation scheme is necessitated at least in part due to the successive hierarchical data mapping from connection level (i.e., multiple physical interfaces on each line card) to a high-speed cell link (HCL) bus level, and to stackplane and fabric levels. In an exemplary implementation, the subport level is comprised of multiple sections, each being responsible for a particular interface type. As one subport type, it can represent a subscriber port (e.g., an xDSL interface) or a fixed physical port such as an STS-1 tributary, wherein each subport is assigned a number of connections. As a bus level subport, it represents an interface that is used by the subscriber line cards or server line cards in the primary shelf to send ATM cells to the fabric via the HCL bus. As a stackplane subport, it represents the subports in the secondary shelves, which use the stackplane to communicate with the switch fabric.

Figure 7:
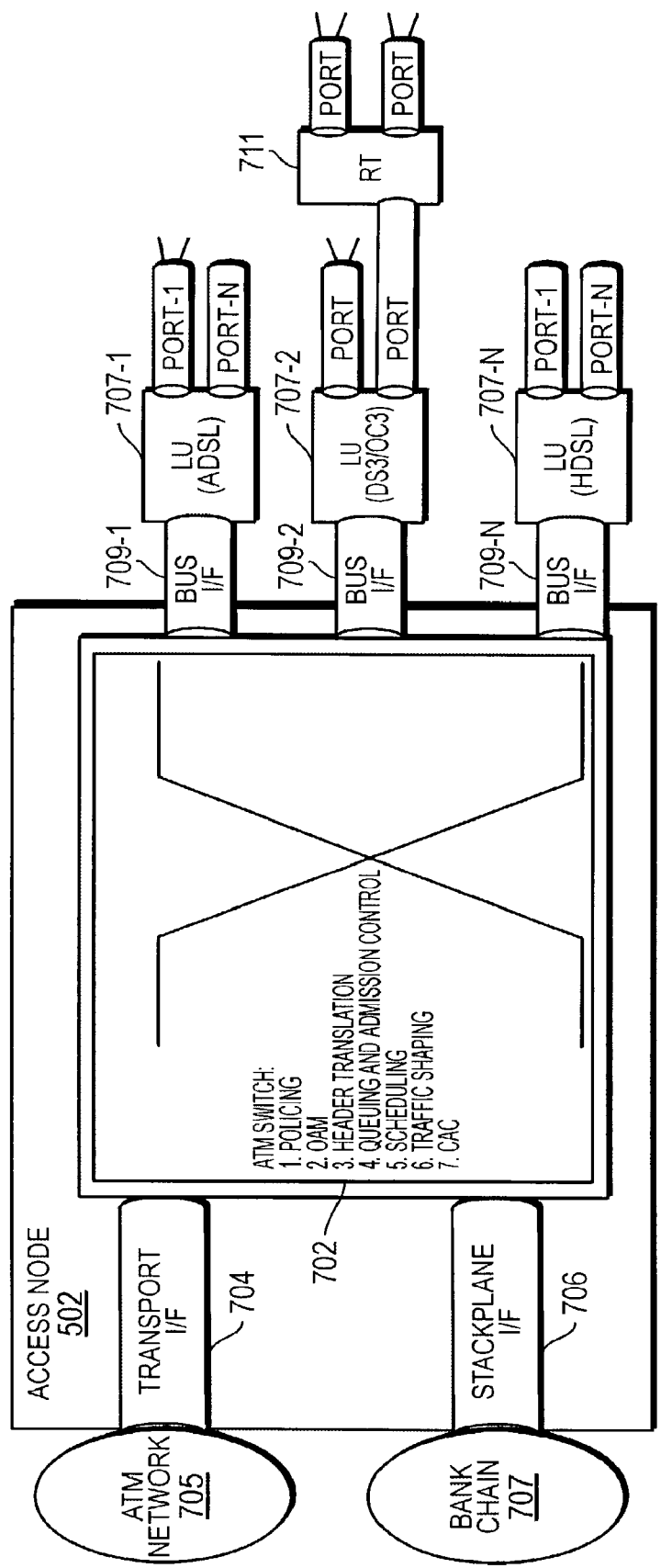
FIG. 7 depicts a functional block diagram of an ATM switch fabric employed in the exemplary access node, which switch fabric utilizes an embodiment of the hierarchical scheduler of the present invention.

FIG. 7 depicts a high level functional block diagram of an ATM switch fabric 702 of the access node element 502 described hereinbefore. The overall functionality of the switch fabric 702 includes: policing; operation, administration and maintenance (OAM); header translation; queuing and admission control; and scheduling and traffic shaping. As can be readily seen, traffic to the fabric 702 is provided via a number of interfaces. A transport interface 704 is operable to connect the node's fabric to a backbone network, e.g., ATM network 705. As alluded to previously, a stackplane interface 706 is operable to carry the traffic from a secondary shelf bank chain 707 (e.g., comprising channel banks 506-1 through 506-4 and channel banks 508-1 through 508-4 shown in FIG. 5) to the fabric 702. A plurality of subscriber interfaces via line units (LUs) 707-1 through 707-N exemplify various service sources such as xDSL, T1, ISDN, DS-3/OC-3, etc., that can interface with the fabric 702 through appropriate bus level ports 709-1 through 709-N. One of the ports of a line unit may be coupled to an RT 711 as part of an access network.

Two types of ATM connections may be defined with respect to the internal ATM traffic: Virtual Channel Connections (VCCs) and Virtual Path Connections (VPCs). A VCC is typically the lowest flow granularity an ATM connection may have, which is identified by a unique value of VCI/VPI pair on a physical interface. A VPC, on the other hand, is defined as a group of all flows that share the same VPI value and a common pool of resources (e.g., bandwidth, etc.). Furthermore, a VCC or a VPC can be either of the following two types: (i) point-to-point connections, wherein bi-directional connections are established and the sources in each direction may be different and (ii) point-to-multipoint connections, which typically utilize a plurality of uni-directional connections for multicast transport across the fabric. In addition, another level of ATM connection hierarchy, called a Virtual Group Connection or VGC, may be implemented within the context of the present invention. Additional details regarding the VGC implementation are provided in the following the commonly owned co-pending U.S. patent application entitled "Virtual Group Connection Scheme For ATM Architecture In An Access Node," filed even date herewith, Application Ser. No.: 10/280,604, in the names of Mudhafar Hassan-Ali et al., incorporated by reference hereinabove.

Ingress traffic management with respect to the flows presented to the switch fabric (whose functionality may be embodied as an ATM cross-connect fabric (XCF) card) generally encompasses three stages: policing, VC queue/buffer allocation and shaping. In one implementation, hardware relating to these stages may be integrated within the XCF card. The primary function of a policer is to ensure that the received cells are compliant with respect to applicable connection descriptors. If not, the incoming cells may be dropped or marked (i.e., tagged) by clearing a Cell Loss Priority (CLP) field in their header portion. In general, the policing functionality is implemented by utilizing well known algorithms described in ITU-T 1.371 and ATM Forum ATMF-TM-121 standards. Essentially, these algorithms (typically categorized as a Generic Cell Rate Algorithm or GCRA) use what is known as a credit counter called bucket and the credit known as tokens. If there is enough credit (i.e., tokens) in the counter (i.e., bucket) upon receiving a cell, then the cell is admitted; otherwise, the cell is tagged as a lower priority cell or discarded.

Three policing algorithms are implemented in the context of the present invention. A Single Leaky Bucket (SLB) module is used with respect to CBR, UBR, and partially in GFR service classes. A Dual Leaky Bucket (DLB) module is used with respect to rt-VBR and nrt-VBR service classes. A Frame Leaky Bucket (FLB) module is used in the GFR class. Two parameters are employed in a typical SLB implementation: size of the bucket (denoted by L) and the increment of token addition or token deletion (i.e., leaking), denoted by I or T. In the CBR, UBR and GFR service classes, the applicable traffic descriptors are PCR and CDVT, which are in turn related to the SLB parametrics. The PCR in this case is proportional to the line rate, which is the physical rate limit of the connection. The CDVT indicates how much of the cell transmission can be done prematurely or how many cells are in a clumped formation at the line speed. In the DLB implementation, four parameters are used, two per bucket. Whereas the first bucket uses PCR and CDVT similar to the SLB case above, the second bucket uses the SCR and MBS descriptors. Both buckets must be satisfied before a cell is determined to be compliant.

The FLB module implemented for the GFR class has two stages of policing. The first stage is to determine if a packet (or frame) is compliant. This is accomplished by testing the following conditions: (i) the cell arrival is compliant with respect to the applicable GCRA function having the PCR and CDVT descriptors; (ii) all cells in a frame have the same CLP value; and (iii) the frame size does not exceed the MFS value. The second stage (a leaky bucket implementation) operates at the frame level. Additional details regarding the GFR implementation in the context of hierarchical scheduling may be found in the commonly owned co-pending U.S. patent application entitled "System And Method For Implementing GFR Service In An Access Node's ATM Switch Fabric," filed even date herewith, Application Ser. No.: 10/280,700, in the names of Mudhafar Hassan-Ali et al., incorporated by reference hereinabove.

After an incoming cell undergoes the policing functions, either successfully or as tagged, it is then appropriately enqueued in the fabric's buffer for scheduling. Each cell is identified by the tuple {PHY, VPI, VCI}, where VPI and VCI are normally carried in the ATM cell header. On the other hand, the PHY identifier is determined by ascertaining the physical interface that the cell is sourced from or destined to. The following bit fields are implemented for cell identification: physical port identifier, PHY, is provided with a 15-bit field; a 12-bit field for VPI; and a 16-bit field for VCI. Hence, in one implementation, the minimum number of bits required per one connection point is 43, which can be quite costly where a large number of connections are to be maintained. Accordingly, as will be seen below in additional detail, the switch fabric of the present invention first maps the {PHY, VPI, VCI} triplet to a unique number, called Flow ID (FID), which allows efficient storage and data structure representation.

Figure 8:
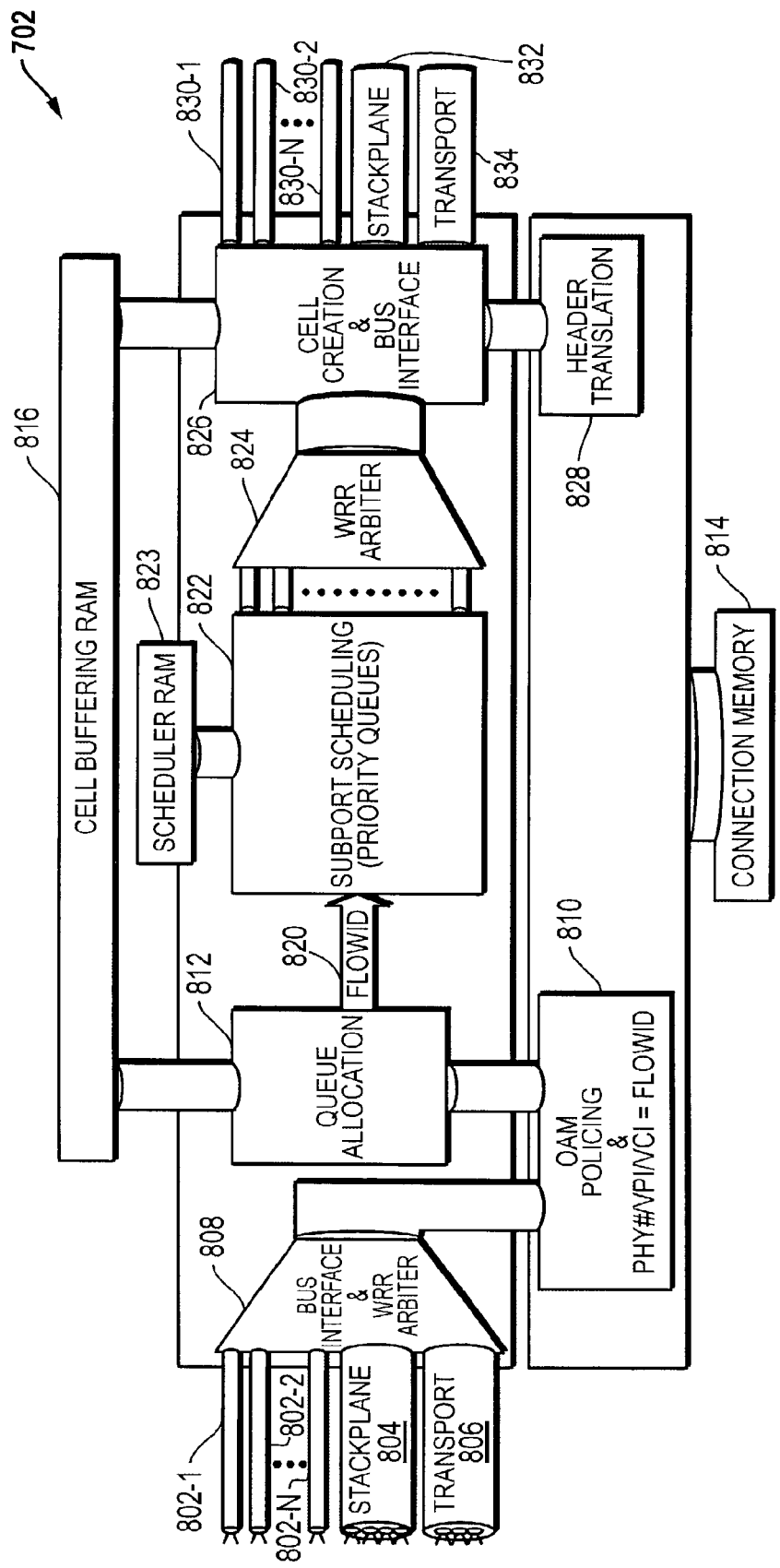
FIG. 8 depicts a functional block diagram with additional details of the ATM switch fabric of the present invention.

Referring now to FIG. 8, shown therein is a functional block diagram of the ATM switch fabric 702 with additional details. A plurality of ingress interfaces including bus level interfaces 802-1 through 802-N, stackplane interface(s) 804 and transport network interface(s) 806 are coupled to an ingress arbiter 808. In one implementation, the ingress arbiter 808 is provided as a Weighted Round Robin (WRR) arbiter that ensures that each interface complies with its bandwidth allocation, as it tries to send cells into the fabric, in accordance with one or several applicable transport contracts. Other types of arbiters, e.g., Non-Work-Conserving RR (NWCRR), may also be used with respect to the traffic on ingress interfaces. The selected ingress traffic is then provided to an OAM/policing block 810, which also has the functionality to translate the {PHY, VPI, VCI} triplet to a unique FID of 16 bits. Thus the FID takes a value in the range of [0;64K-1], wherein a binary tree is used for efficiently mapping the 43-bit {PHY, VPI, VCI} triplet. The flows are then forwarded to a queue allocation manager 812 which is responsible for enqueuing a cell to a particular queue based on its FID. In other words, each flow is allocated a unique VC queue in a shared-memory cell buffer RAM 816. The VC queues in the buffer are provided as logical linked lists that also have head and tail pointers so as to emulate a FIFO. The shared-memory queue architecture in the switch fabric allows a shared pool of buffer space to be used by all the connections within applicable connection contract limitations. As soon as a cell is deleted (either emitted or discarded), its location is returned to a list that holds all the "free cell" locations, called a free list. This list links all the cell memory locations in a head-to-tail manner, with the following rules: (i) upon buffering, use the head pointer to point to the first cell location available for buffering; and (ii) upon deletion, use the tail pointer to attach the newly freed location to the free list. The queue manager 812 manages all the connection VC queues as well as the free list.

When a cell is ready to be enqueued, the queue manager 812 first checks whether there exists a queue for the connection identified by the FID that the cell belongs to. If so, it will be added to the VC queue list; otherwise, it will create a new queue, that is, the head and tails pointers of the new queue are initialized. Further, before the cell is added to the queue, the queue manager 812 may conduct one or more tests on the cell, the queue size, the level of congestion in the fabric, and the level of congestion of the group, along with packet state indications to determine if the cell should be stored in the queue or not. Thus, the queuing functionality addresses the following concerns with respect to the fabric: (i) buffering of the cells during contention for fabric resources (e.g., a switch connection); (ii) during congestion (i.e., the offered load is higher than the capacity of the fabric), implementation of cell drop policies as congestion control mechanisms; and (iii) in bursty traffic situation, which is the case most of the time, buffering helps attain a significant statistical gain, defined as the ratio between instantaneous offered load and average offered load.

The queue manager 812 provides the FIDs stored in a connection memory 814 to a subport scheduler 822 which performs hierarchical scheduling, detailed hereinbelow, so as to manage traffic shaping and flow routing to elect most eligible connections to send the cells across the fabric. A scheduler RAM 823 inserts FIDs in the subport scheduler's priority queues based on such parametrics as the cell's theoretical arrival time (TAT). An arbiter 824 then provides the elected FIDs (i.e., those corresponding to winner cells) to a cell creation and bus interface block 826. Once winners are determined by the scheduler and all updates within the queues have been performed, a header translator block 828 is used to convert the FIDs to new cell headers that include the PHY information relating to the destination ports. Similar to the ingress interfaces, a plurality of egress interfaces are coupled to the cell creation block 826, which egress interfaces include bus level interfaces 830-1 through 830-N, stackplane interface(s) 832 and transport interface(s) 834.

Figure 9:
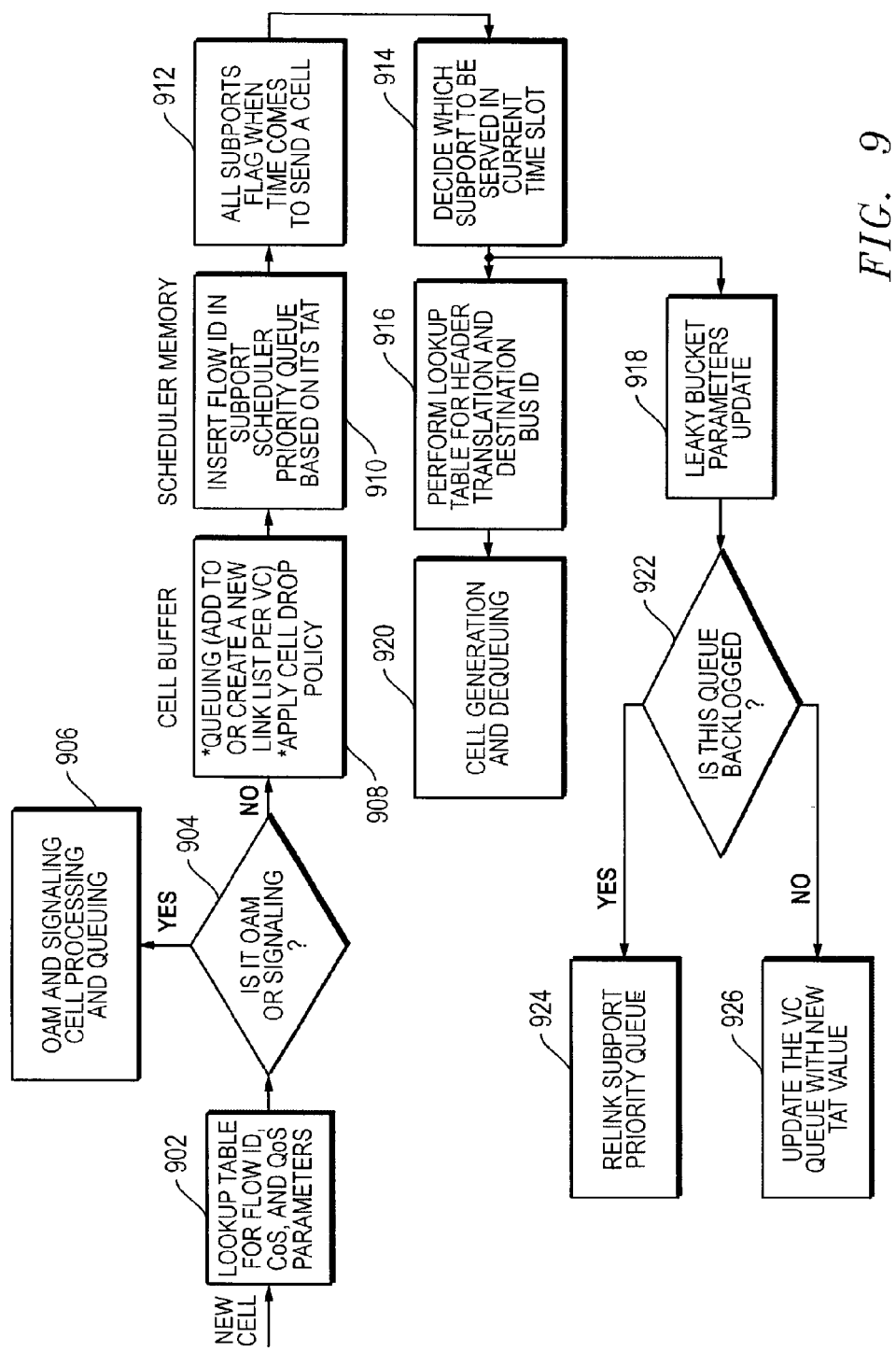
FIG. 9 is a flow chart of the various operations involved in scheduling/switching a flow in accordance with the teachings of the present invention.

Based on the foregoing, it should be apparent that the overall functionality of the ATM switch 702 of the access node element includes the following: address translation; OAM functionality; policing to ensure that the received cells are compliant with their traffic contract(s); queue allocation and management; admission control; scheduling; traffic shaping of the cells according to their traffic contract; CAC mechanisms to ensure that enough resources are available before a connection is admitted. FIG. 9 is a flow chart of the various operations involving the ATM scheduling/switching functionality set forth above. When a new cell arrives, a look-up table is queried to determine its FID, CoS and QoS parameters (block 902). A determination is made whether the cell relates to an OAM/signaling flow (decision block 904). If so, the cell flow is provided to an appropriate processing block 906 relating to OAM and signaling cell processing. Otherwise, the received cell is provided to a queue manager for cell buffer queuing and, if necessary, application of cell discard policies (block 908). The FID is then inserted into a priority queue (PQ) of the hierarchical subport scheduler for scheduling (block 910), which will be described in additional detail below. The subports raise a flag when it is time to send cells through the fabric (block 912), and upon initiation of a new time slot associated with the fabric, an arbitration decision is made as to which subport will be served in the current time slot (block 914). Upon selecting a winner cell, a loop-up table is queried for header translation and determination of destination bus/port ID (block 916). The egress cell is then generated at block 920 for transport across the fabric. Also, the served cell is de-queued from the appropriate VC queue in cell buffers. The Leaky Bucket parameters are updated for the flow associated therewith (block 918). Based on a determination whether the queue is backlogged (decision block 922), the subport priority queue will be re-linked (block 924) or the VC queue will be updated with a new TAT value (block 926).

Figure 10:
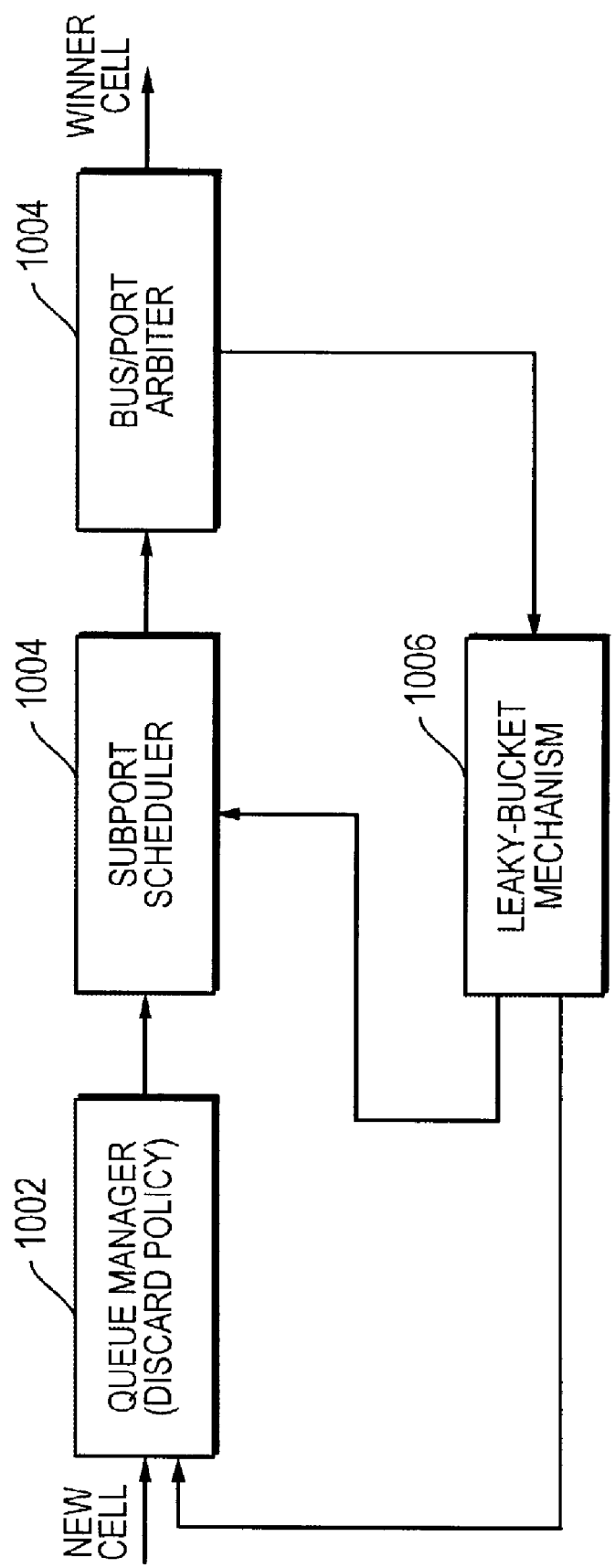
FIG. 10 depicts a high level functional block diagram of an exemplary embodiment of the scheduler of the present invention.

Referring now to FIG. 10, depicted therein is a high level functional block diagram of an exemplary embodiment of the scheduler of the present invention. A queue manager 1002 with appropriate cell discard mechanism processes a new ingress cell. As explained above, a subport scheduler 1004 then operates using a hierarchical scheduling process to select a winner cell an a per-service Class basis. The winner cells are then forwarded to a bus/port arbiter 1004 that selects an overall winner for service. A Leaky Bucket (LB) mechanism 1006 updates the flow parameters based on the arbitration results, which update information is provided to the queue manager 1002 or the subport scheduler 1004 depending on queue backlogging.

Figure 11:
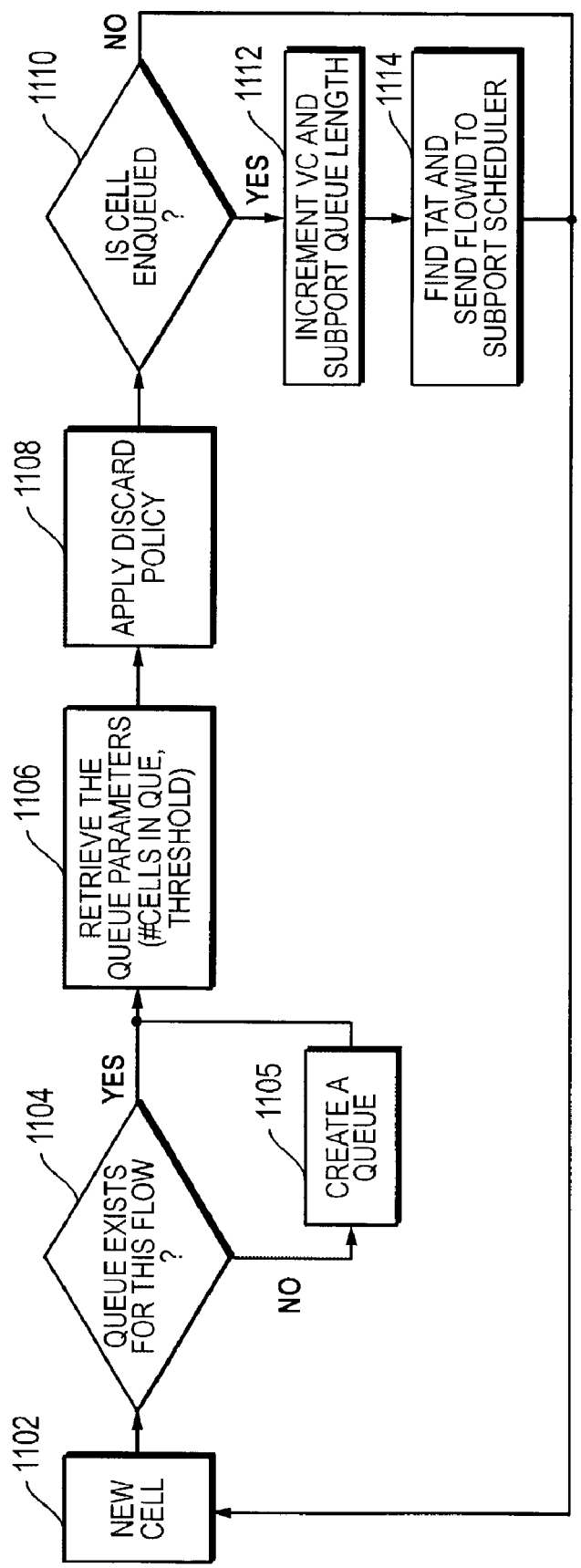
FIG. 11 is a flow chart of the operations involved in queue management with respect to preparing an ingress flow for scheduling through a hierarchical scheduler of the present invention.

FIG. 11 is a flow chart of the operations involved in queue management with respect to preparing an ingress flow for scheduling through the hierarchical scheduler of the present invention. When a new cell arrives (shown in block 1102), appropriate FID will be determined, as explained hereinabove. A determination is made whether a VC queue exists for this flow in a cell buffer memory (decision block 1104). If so, appropriate queue parameters, e.g., number of cells in queue, threshold parametrics, et cetera) are retrieved (block 1106). Otherwise, a new queue will be created by appropriate means (block 1105). As alluded to before, a cell discard policy block 1108 is responsible for deciding whether to enqueue the cell or discard it. Some of the policy reasons for implementing a cell discard mechanism are: (i) fairness in allocating the buffering resources among different connections in accordance with their service contracts; and (ii) avoidance of fabric network congestion, which is indicated by a Queue Occupancy (QO) parameter. Depending on implementation, QO can be measured either on a per-VC queue basis or for the entire available shared buffering. Some of the exemplary discard policy implementations will be set forth immediately hereinbelow.

In a Single Cell Discard (SCD) policy, the queue is assigned a threshold at which the cell discard process is triggered. The discard mechanism may be CLP-sensitive or CLP-insensitive, and is typically implemented in CBR and VBR connections. In a Partial Packet Discard (PPD) policy, the discard mechanism is based on the status of the packet carried over ATM cells within the queue. Again, the queue is partitioned into two spaces by a threshold. All cells are accepted before the QO reaches the threshold. As soon as the threshold is reached, if one cell belonging to the partially buffered packet is discarded, then the rest of the cells belonging to that packet are also discarded, except the last cell in the packet so as to maintain packet isolation. It should be evident that this mechanism avoids sending a tail of a packet that has lost one or more cells; the result being a more efficient use of fabric transport resources.

In implementing an Early Packet Discard (EPD) policy, a threshold similar to that of the PPD policy is utilized, except that after reaching the threshold, all the cells belonging to the partially buffered packet will be buffered. Although the QO threshold has been exceeded, all the cells of a new packet will be discarded when the new packet arrives. This mechanism is more efficient than the PPD policy since it will avoid transmission of partial packets. Both PPD and EPD policies are suitable for use in GFR as well as UBR connections carrying ATM Adaptation Layer-5 (AAL5) cells.

While similar to the PPD/EPD mechanisms, an Early Discard (ED) policy implements a mechanism whereby the discard process is performed at the head of the first cell of the last packet to be sent to the tail of the associated VC queue. In this case, the queue needs to keep track of the last packet in queue by using a pointer to the cell that occurs after the cell with a particular Payload Type Identifier (i.e., PTI=1). A more powerful packet discard mechanism is implemented in a Random Early Detection (RED) process, wherein a better prediction is made with respect to any congestion onset. A parameter called average QO is calculated as a regressive evaluation of the actual average queue length over time, which is compared against a predefined minimum threshold and a predefined maximum threshold. A probability parameter used as another threshold trigger for discard decisions. Essentially, a packet may be discarded (i) if the average QO is outside the range defined by the maximum threshold, or (ii) if the average QO is within the range but a randomly generated number P is less than the probability parameter that is defined as a function of the average QO.

Continuing to refer to FIG. 11, a decision block 1110 determines if the new cell is to be enqueued or not. If yes, the associated VC queue and subport priority queue lengths are appropriately incremented (block 1112). Accordingly, if the cell is admitted in the VC queue and is the head of line (HOL) of the queue, the queue manager informs the subport scheduler that owns the corresponding flow to insert it in its priority queue. The priority queue is then notified of the cell's FID, the flow's Leaky Bucket parameters (i.e., TAT values), which are forwarded to it for scheduling operations (block 1114).

Figure 12:
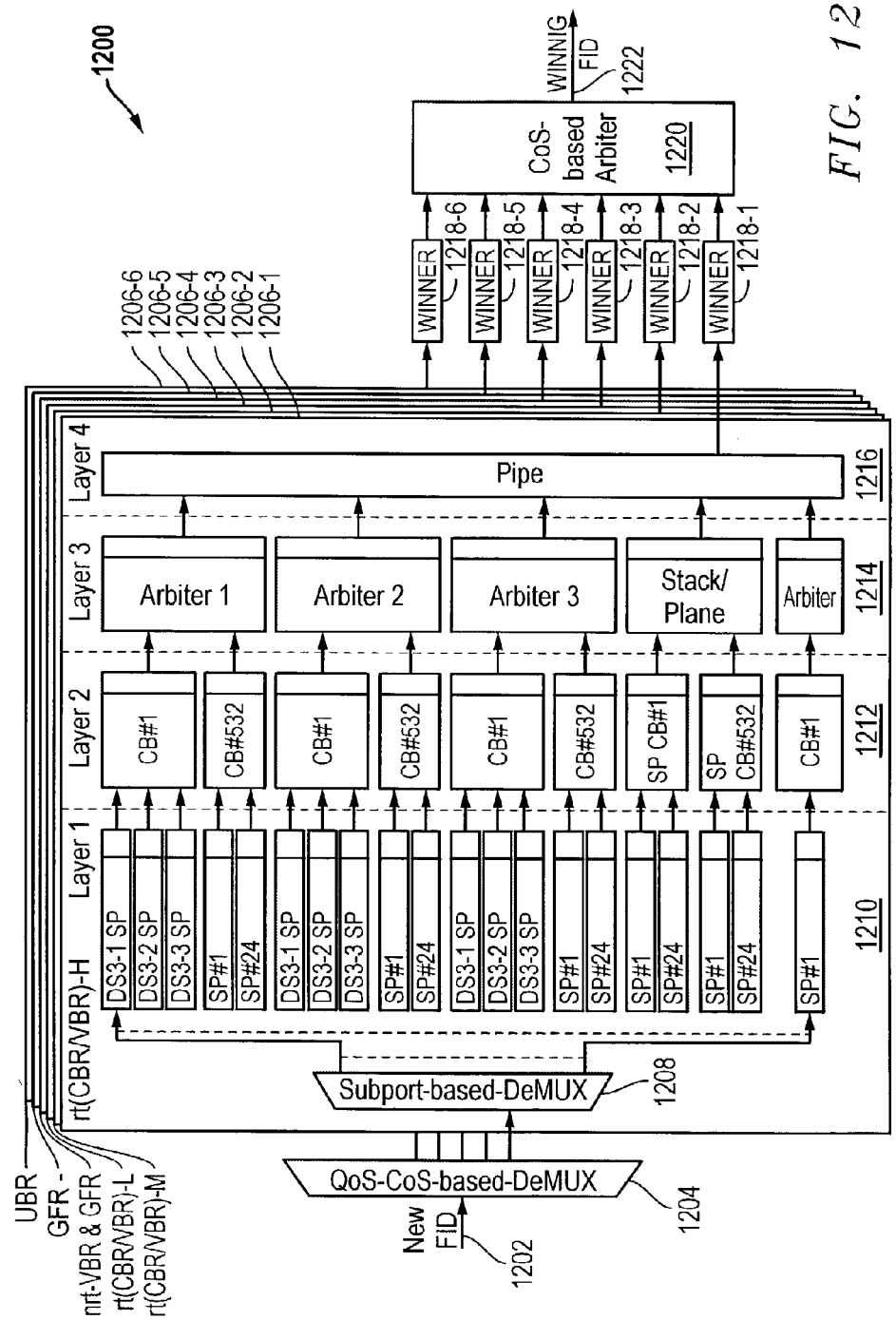
FIG. 12 depicts a functional block diagram of a multi-layer, multi-plane scheduler of the present invention.

Accordingly, it should be appreciated that an ATM scheduler's main task is to regulate the injection of incoming cells compliant with a traffic descriptor into the switching fabric, attain optimum isolation between fabric connections, distribute the fabric's bandwidth in a fair way, and to achieve statistical gains by better utilization of the available bandwidth. Essentially, the overarching goal is to determine which of cell sources are to be selected for transmission through the fabric. Because the access node's internal ATM flows are aggregated at multiple structural levels based on its scalable stackplane architecture, i.e., the subport, HCL bus, stackplane, shelf, et cetera, layers discussed in detail above, the scheduling functionality needs to account for such telescopic data pipe aggregation. Further, as pointed out previously, the scheduling functionality must also contend with the various service priority categories associated with the ingress flows. Consequently, the scheduler of the present invention is provided with a two-dimensional hierarchical architecture, wherein the scheduling functionality is partitioned among the data flow aggregation layers as well as the service priority categories (referred to as "planes"). FIG. 12 depicts a functional block diagram a multi-layer, multi-plane scheduler embodiment 1200 of the present invention, wherein four hierarchical layers 1210, 1212, 1214 and 1214 are exemplified in conjunction with six service category planes. Reference numeral 1206-1 refers to the "rt[CBR/VBR]—HIGH" service plane which includes the four successive stages of scheduling that correspond to the four hierarchical layers (i.e., L1 through L4). Likewise, the following service planes are provided in parallel: rt[CBR/VBR]—MEDIUM plane 1206-2, rt[CBR/VBR]—LOW plane 1206-3, nrt-VBR and GFR plane 1206-4, GFR-plane 1206-5 and UBR (i.e., Best Effort) plane 1206-6, each having the L1-L4 layer architecture.

Each subport of the scheduler uses (or builds) a PQ which is a data structure that stores all active FIDs (i.e., the VC queue associated with the FID has at least one cell in it). When a new FID 1202 associated with an ingress cell is presented by the queue manager for purposes of scheduling, a CoS/QoS-based de-multiplex (DEMUX) block 1204 segregates it into, or assigns it to, one of the service plane categories based on its CoS/QoS and traffic contract parametrics. Thereafter, a subport-based DEMUX block 1208 further segregates the cell FID based on the appropriate subport interface to the fabric. The FIDs are thus sorted various PQ data structures according to: (i) CoS, which groups FIDs for isolating different Classes; (ii) the cell time stamp (TS), which is the time when the cell is eligible to be chosen for scheduling; and (iii) QoS, which is used for prioritization when TS of two or more FIDs have the same value. Additional details regarding how a particular FID is sorted into one of the PQ structures, each corresponding to a service plane, will be set forth below in reference to FIG. 14.

The four-layer hierarchical scheduling functionality is implemented by means for a PQ module (PQM) (not shown in this FIG.), wherein each layer performs the scheduling function for an entry, which can be one of the following based on the flow aggregation: subport, bus, port, and pipe. Essentially, when a cell of new flow is received by the fabric, this data flow is represented by one entry in the scheduler as follows. The FID is received from the appropriate Leaky Bucket Module (LBM)) and, based on the CoS/QoS, the data of the flow (i.e., FID and TS) are stored in the applicable L1 data structure. From all competing subports in L1 (e.g., different flows from a line unit), only one with the minimum TS is selected by the L1 arbiter, which is then forwarded to the next layer's arbitration, i.e., L2 arbitration. The L2 data structure accordingly contains "winner FID/TS" data from different subports. Again, only one entry having the minimum TS is selected to be forwarded to Layer 3. The scenario is thus successively repeated for Layer 3 and Layer 4, which ultimately results in a winner nominee (i.e., the FID/TS data of the winning cell) for each service priority category. Reference numerals 1218-1 through 1218-6 refer to the six winner nominees that correspond to the six service planes exemplified in FIG. 12.

A two-dimensional arbitration mechanism 1220 is thereafter employed for selecting an overall winner among the six nominees. In one exemplary embodiment, the arbitration block 1220 is provided as a CoS-aware, TS-based Priority Round Robin (PRR) mechanism that is operable to select a winner FID 1222 based on service category as well as the time stamp data. Thus, the arbiter 1220 not only determines whether a cell with higher service priority is ready to be serviced in the current time slot, but it also attempts to send a cell having the lowest time stamp as compared to a global time variable.

Figure 13:
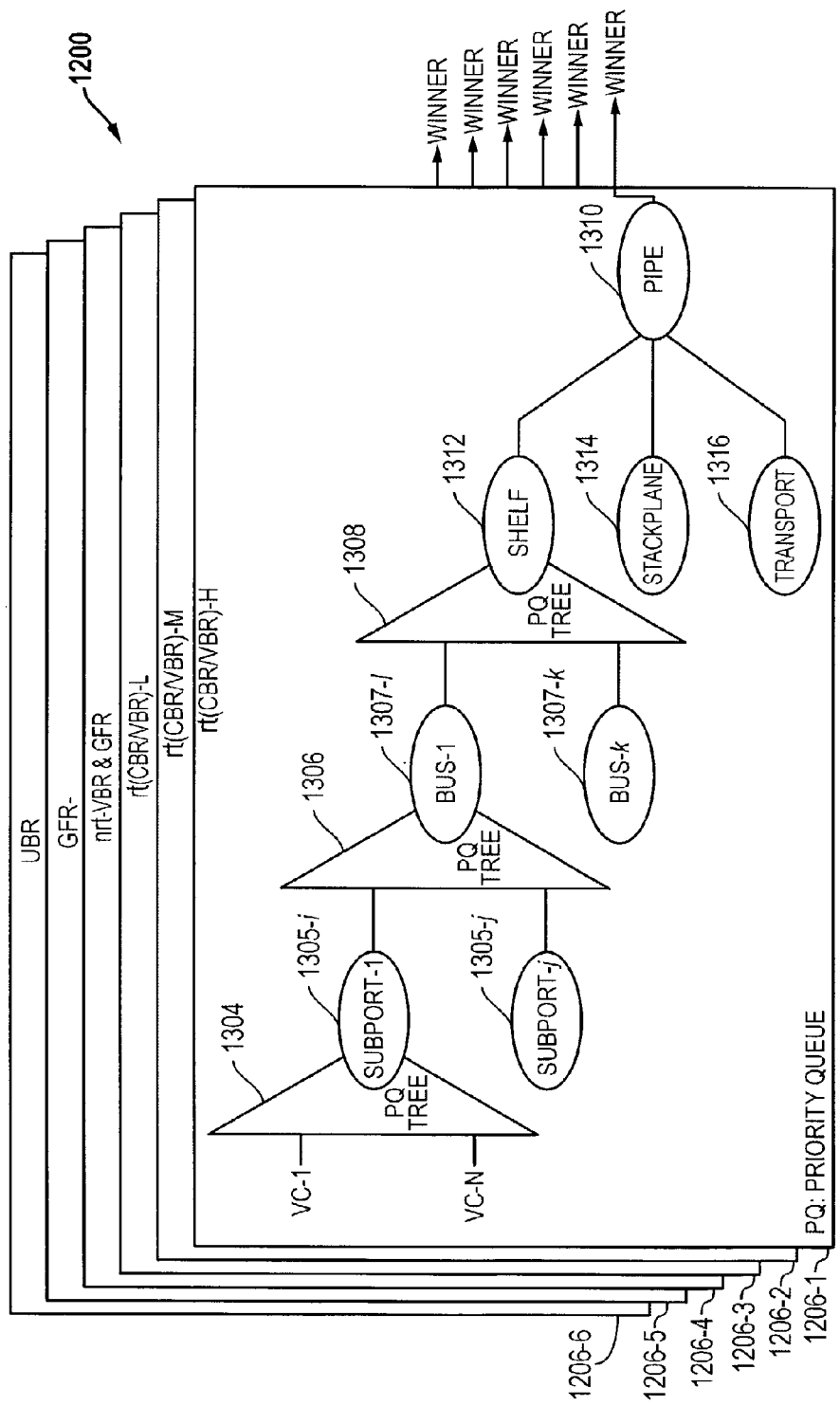
FIG. 13 depicts another view of the multi-layer, multi-plane scheduler shown in FIG. 12.

It should therefore be recognized that arbitration at each layer (i.e., L1-L4 arbitrations) involves managing the PQ structures associated therewith for selecting a winner for that layer. In general, the PQ structures are implemented in a tree fashion, wherein the data nodes (representing, e.g., the TS/FID of the admitted cell or the cell selected from the lower layer) are arranged in accordance with certain insertion/deletion rules. FIG. 13 depicts another view of the multi-layer, multi-plane scheduler 1200 wherein each of the PQ entities is shown as a tree structure, resulting in an overall nested tree arrangement for each service plane. Reference numeral 1304 refers to the PQ tree corresponding to a subport arbiter 1305-$i$, wherein the PQ tree is formed based on the VC connections supported by the corresponding subport. The winners from all the subport arbiters (e.g., subport arbiters 1305-$i$ and 1305-$j$) are forwarded to populate the next-level PQ tree structure 1306 associated with a bus level arbiter 1307-$l$. Likewise, the bus level arbiters 1307-$l$ and 1307-$k$ forward the respective selections to a shelf level PQ structure 1308. A shelf level arbiter 1312, a stackplane interface 1314, a transport level interface 1316 forward their selections to a pipe level arbiter 1310 that selects a winner nominee for a particular service plane.

In an exemplary tree-based PQ implementation, the algorithm for inserting or deleting an element in a PQ is as follows. (i) The value of a root node of a tree or sub-tree is greater than the values associated with all other nodes in the tree. (ii) When inserting a new member, filling is performed from top to bottom and from left to right. If the new member's value is greater than the root node's value, then the structure is pushed down. (iii) The root of the PQ tree is the first one out. (iv) Upon deleting a root node, the larger of the two children from the root will succeed.

A number of data structures can be provided to implement the tree-based PQs used in the context of hierarchical scheduling as set forth in the present patent application. In one exemplary implementation of the present invention, the PQ entities may be embodied as a heap structure. Whereas the heap implementation is generally optimal in memory utilization, it suffers from algorithmic complexity that can limit the throughput in a high-speed design. In another implementation, accordingly, the layer-specific PQ entities are embodied as a hybrid "calendar heap" structure, which is described in additional detail in the commonly owned co-pending U.S. patent application entitled "Calendar Heap System And Method For Efficient Sorting," filed even date herewith, Application Ser No.: 10/281,033, in the names of Mudhafar Hassan-Ali et al., incorporated by reference hereinabove.

Figure 14:
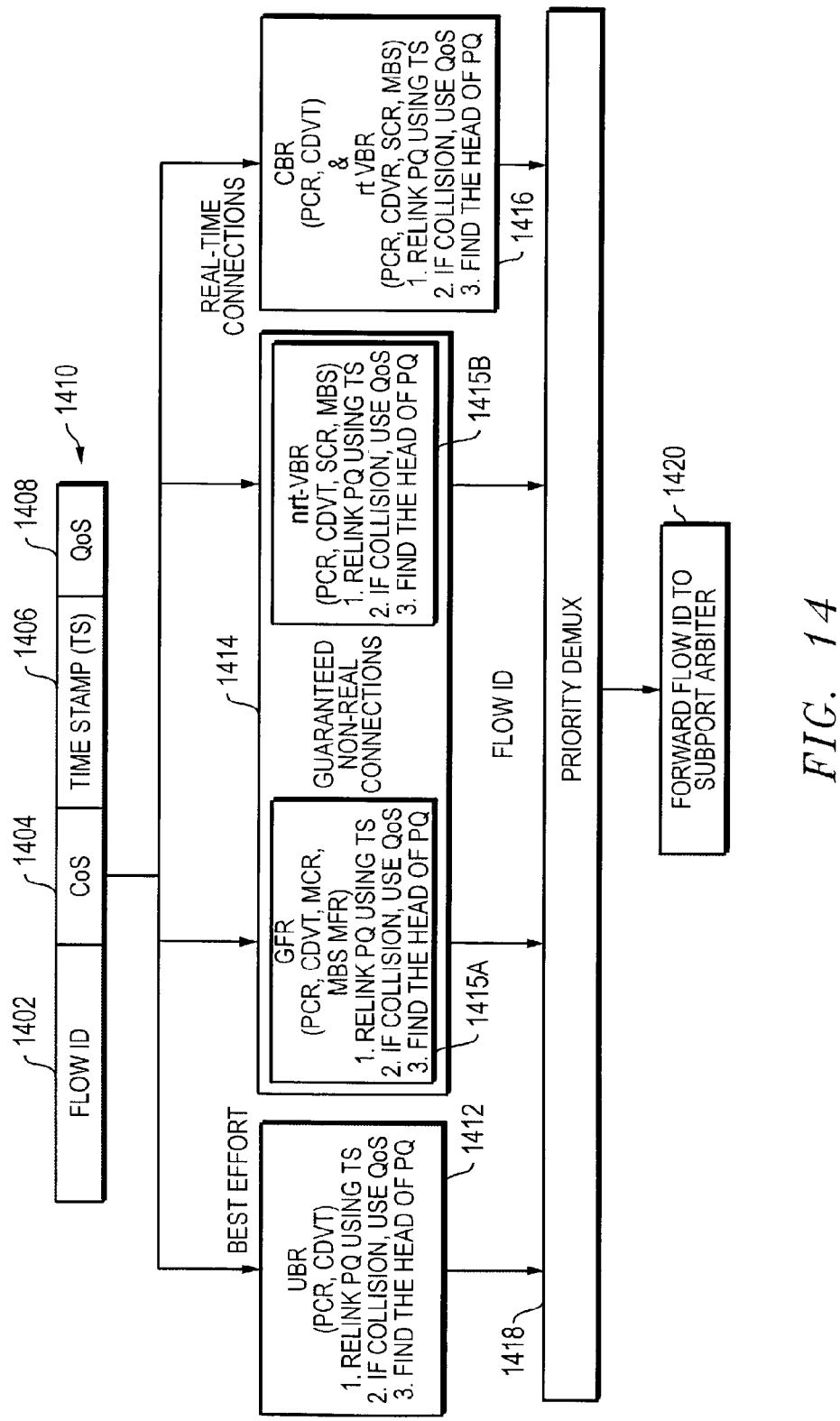
FIG. 14 depicts a structural flow block diagram of an exemplary methodology for sorting a particular Flow ID into one of the priority queue structures.

Referring now to FIG. 14, depicted therein is a structural flow chart describing an exemplary methodology as to how a particular FID is sorted into one of the PQ structures depending on the CoS, QoS and TS parametrics. Each cell is assigned a tag 1410 that is used for re-linking in the scheduler's PQ associated therewith. The tag 1410 comprises flow ID 1402, CoS 1404, TS 1406 and QoS 1408. For a Best Effort service class (i.e., the UBR service), the PCR and CDVT parameters are used (block 1412), wherein the PQ is re-linked using the TS. If there is any collision, the QoS portion of the tag is used as a resolution mechanism. The head of the PQ is then determined for forwarding to a priority DEMUX (block 1418). Operations concerning guaranteed nrt connections are set forth in block 1414, which is separated into a block of GFR-related operations (block 1415A) and a block of nrt-VBR operations (block 1415B). Likewise, operations concerning the CBR connections are set forth in block 1416. The FIDs from each service priority are forwarded to the DEMUX (block 1418), which then forwards the FIDs to the subport arbiter (block 1420).

Figure 15:
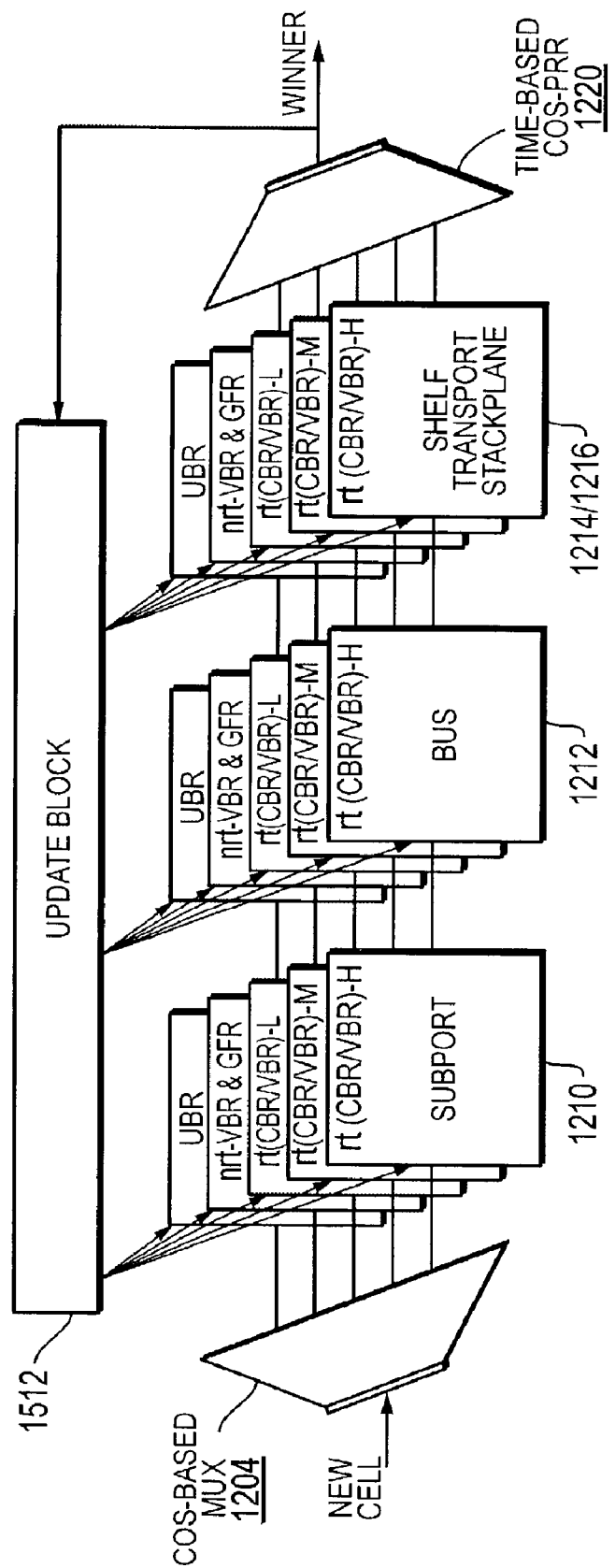
FIG. 15 depicts an exemplary pipeline pointer-based architecture used for updating the priority queues used in the scheduler of the present invention.

As set forth previously, upon selecting a winner cell for service through the fabric, all PQ structures in which the winner cell is represented (across the aggregation layers) need to be updated by removing the winning cell's FID therefrom. It may get re-linked in the PQ structures if the flow is still backlogged. These operations are generally computationally intensive. In one exemplary implementation, accordingly, a pointer-based pipeline architecture is employed, shown in FIG. 15, for updating the PQ trees upon winner selection. To regulate the emission of cells from each layer, an SLB is associated therewith. Every time there a candidate cell for a PQ, its TS needs to be qualified by the SLB's TS. For example, at the subport layer 1210, the TS for a connection is qualified with the TS generated by the SLB of the subport. As described earlier, the SLB is defined by the GCRA function {PCR, CDVT}. When CDVT is taken to be zero, the SLB will try to emulate a virtual CBR pipe that matches the subport's physical transmission rate. The qualification is defined as follows: TS of subport=Max {max $\{TS_{VC_x}$ for x=1, . . . , $i_{subport-j}\}$, $TS_{subport-j}\}$. The same operation is performed on the other layers as well. Upon selecting a winner cell by the time-based CoS-PRR 1220, an update block 1502 uses a pipeline pointer to modify the PQ structures of all layers across the service planes.

Further, as described above in reference to the flow chart shown in FIG. 9, the LB parameters of the winning cell's FID are also updated. A Leaky Bucket Calculator (LBC) is used as a state machine for updating purposes, wherein the eligibility of a cell is determined according to the traffic contract as well as the history of the connection to which the cell belongs. When used for policing, as explained earlier, it determines the compliance of the cell; whereas when used in shaping, it determines the time when the cell is eligible for service. Regardless, there exists a concern in computing the LB parameters, however, that arises due to the finite word lengths used for parametric representation (i.e., TS, TAT, etc.). It should be apparent, therefore, that in terms of the ATM traffic flow the effect is that when a TS is assigned to a particular flow and it wraps around after the expiration but before the flow is serviced, the flow becomes stale because the TS has expired. An exemplary implementation of a solution addressing this issue involves the following. For the incoming flows, TAT and TS parameters are maintained upon determining the respective CoS levels for the flows. An algorithmic process is provided for determining a time expiration condition involving the TAT and TS values. When an appropriate expiration condition is detected, a new time value is substituted for the TS value. Additional details regarding the "wraparound" process may be found in the commonly owned co-pending U.S. patent application entitled "System And Method For Implementing GFR Service In An Access Node's ATM Switch Fabric," filed even date herewith, Application Ser. No. 10/280,700, in the names of Mudhafar Has san-Ali et al., incorporated by reference hereinabove.

Based upon the foregoing Detailed Description, it should be appreciated that the present invention advantageously provides an innovative ATM scheduler implementation for use with access node elements architected to support diverse services and multiple traffic types while affording efficient scalability. By partitioning the scheduling functionality on a per-service category basis and across a plurality of hierarchical data pipe aggregations as may be necessitated by the scalable hardware architecture, traffic contract compliance as well as requisite connection isolation and fair bandwidth allocation can be effectively achieved in the ATM switching fabric of the present invention without complex and highly expensive hardware implementations. Further, usage of RAM-based heap and calendar heap data structures in the scheduling core provides simpler database arrangements leading to efficient switching. Moreover, scalable provisioning of hardware supported by the hierarchical ATM scheduler architecture in accordance with the teachings of the present invention advantageously affords a cost-effective business model for providing additional, value-added services (involving real time video (e.g., video-on-demand), data, graphics, and multimedia) on different access network infrastructures.

It is believed that the operation and construction of the present invention will be apparent from the foregoing Detailed Description. While the embodiments of the invention shown and described have been characterized as being exemplary, it should be readily understood that various changes and modifications could be made therein without departing from the scope of the present invention as set forth in the following claims.

What is claimed is:

1. A hierarchical scheduler for use with an access network element having a fabric that is operable to switch a plurality of ingress flows, wherein each of said ingress flows comprises a plurality of cells and is aggregated in said access network element via a plurality of aggregation layers, comprising:
   means for determining a flow identifier (FID) for an ingress cell;
   means for segregating said ingress cell based on a service priority category;
   for each service priority category, means for selecting a winner cell for each aggregation layer and for forwarding said winner cell to next aggregation layer including means for selecting a winner cell from a plurality of contending cells at a subport level layer and means for selecting a winner cell from a plurality of contending cells at a bus level layer forwarded from said subport level layer; and
   means for arbitrating among winner cells from each service priority category in order to select an overall winner cell for emission through said fabric.

2. The hierarchical scheduler for use with an access network element as set forth in claim 1, wherein said means for arbitrating among said winner cells comprises a time-based priority round robin arbiter mechanism.

3. The hierarchical scheduler for use with an access network element as set forth in claim 1, wherein said service priority category is associated with a particular class of service.

4. The hierarchical scheduler for use with an access network element as set forth in claim 3, wherein said particular class of service includes a Constant Bit Rate (CBR) service class.

5. The hierarchical scheduler for use with an access network element as set forth in claim 3, wherein said particular class of service includes a real-time Variable Bit Rate (rt-VBR) service class.

6. The hierarchical scheduler for use with an access network element as set forth in claim 3, wherein said particular class of service includes a non-real-time Variable Bit Rate (nrt-VBR) service class.

7. The hierarchical scheduler for use with an access network element as set forth in claim 3, wherein said particular class of service includes an Unspecified Bit Rate (UBR) service class.

8. The hierarchical scheduler for use with an access network element as set forth in claim 3, wherein said particular class of service includes a Guaranteed Frame Rate (GFR) service class.

9. The hierarchical scheduler for use with an access network element as set forth in claim 1, wherein said service priority category is associated with a quality of service parameter.

10. The hierarchical scheduler for use with an access network element as set forth in claim 1, wherein said means for selecting a winner cell for each aggregation layer includes means for selecting a winner cell from a plurality of contending cells at a shelf level layer forwarded from said bus level layer.

11. The hierarchical scheduler for use with an access network element as set forth in claim 10, wherein said means for selecting a winner cell for each aggregation layer includes means for selecting a winner cell from a plurality of contending cells at a pipe level layer forwarded from said shelf level layer.

12. A hierarchical scheduling methodology for use with an access network element having a fabric that is operable to switch a plurality of ingress flows, wherein each of said ingress flows comprises a plurality of cells and is aggregated in said access network element via a plurality of aggregation layers, comprising the steps:
   determining a flow identifier (FID) for an ingress cell and enqueuing said FID into a queue associated with said ingress cell's flow;
   segregating said ingress cell based on a service priority category;
   for each service priority category, selecting a winner cell for each aggregation layer and forwarding said winner cell to next aggregation layer including selecting a winner cell from a plurality of contending cells at a subport level layer and selecting a winner cell from a plurality of contending cells at a bus level layer forwarded from said subport level layer;
   arbitrating among winner cells from each service priority category in order to select an overall winner cell for emission through said fabric; and
   updating queues associated with said ingress flows upon selecting said overall winner cell.

13. The hierarchical scheduling methodology for use with an access network element as set forth in claim 12, wherein said step of arbitrating among said winner cells is performed by a time-based priority round robin arbiter mechanism.

14. The hierarchical scheduling methodology for use with an access network element as set forth in claim 12, wherein said service priority category is associated with a particular class of service.

15. The hierarchical scheduling methodology for use with an access network element as set forth in claim 14, wherein said particular class of service includes a Constant Bit Rate (CBR) service class.

16. The hierarchical scheduling methodology for use with an access network element as set forth in claim 14, wherein said particular class of service includes a real-time Variable Bit Rate (rt-VBR) service class.

17. The hierarchical scheduling methodology for use with an access network element as set forth in claim 14, wherein said particular class of service includes a non-real-time Variable Bit Rate (nrt-VBR) service class.

18. The hierarchical scheduling methodology for use with an access network element as set forth in claim 14, wherein said particular class of service includes an Unspecified Bit Rate (UBR) service class.

19. The hierarchical scheduling methodology for use with an access network element as set forth in claim 14, wherein said particular class of service includes a Guaranteed Frame Rate (GFR) service class.

20. The hierarchical scheduling methodology for use with an access network element as set forth in claim 12, wherein said service priority category is associated with a quality of service parameter.

21. The hierarchical scheduling methodology for use with an access network element as set forth in claim 12, wherein said step of selecting a winner cell for each aggregation layer includes selecting a winner cell from a plurality of contending cells at a shelf level layer forwarded from said bus level layer.

22. The hierarchical scheduling methodology for use with an access network element as set forth in claim 21, wherein said step of selecting a winner cell for each aggregation layer includes selecting a winner cell from a plurality of contending cells at a pipe level layer forwarded from said shelf level layer.

23. An access network element, comprising:
at least one network interface operable to couple said access network element to a transport network;
a plurality of subscriber interfaces operable to serve subscribers;
means to aggregate ingress traffic received via said at least one network interface and said subscriber interfaces into multiple levels of data pipe structures, each being deemed as an aggregation layer including at least a subport level layer and a bus level layer, wherein a winner cell is selected from a plurality of contending cells at said subport level layer and a winner cell is selected from a plurality of contending cells at said bus level layer forwarded from said subport level layer, wherein said ingress traffic is formatted into Asynchronous Transfer Mode (ATM) cells; and
an ATM fabric operable to switch said ingress traffic, said fabric including a hierarchical scheduler for regulating emission of ingress cells towards egress interfaces, wherein said ingress cells are segregated depending a service priority category and an arbitration mechanism selects winner cells at each aggregation layer per a particular service priority category, whereby a service-based arbiter selects overall winner cells for emission through said fabric.

24. The access network element as set forth in claim 23, wherein said ATM fabric includes means for policing said ingress traffic.

25. The access network element as set forth in claim 23, wherein said transport network includes a circuit-switched network.

26. The access network element as set forth in claim 23, wherein said transport network includes a packet-switched network.

27. The access network element as set forth in claim 23, wherein said transport network includes an ATM network.

28. The access network element as set forth in claim 23, wherein said transport network includes an optical network.

* * * * *